(12) United States Patent
Nagura

(10) Patent No.: US 10,540,559 B2
(45) Date of Patent: Jan. 21, 2020

(54) POSITION DETECTION APPARATUS, LENS APPARATUS, IMAGE PICKUP SYSTEM, MACHINE TOOL APPARATUS, POSITION DETECTION METHOD, AND NON-TRANSITORY COMPUTER-READABLE STORAGE MEDIUM WHICH ARE CAPABLE OF DETECTING ABNORMALITY

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 14/970,715

(22) Filed: Dec. 16, 2015

(65) Prior Publication Data

US 2016/0180516 A1    Jun. 23, 2016

(30) Foreign Application Priority Data

Dec. 19, 2014    (JP) ................. 2014-256842

(51) Int. Cl.
*G06T 7/70*    (2017.01)
*G06T 7/00*    (2017.01)
(Continued)

(52) U.S. Cl.
CPC ......... *G06K 9/036* (2013.01); *G01D 5/34707* (2013.01); *G01D 5/34715* (2013.01);
(Continued)

(58) Field of Classification Search
CPC . G02B 7/102; G02B 7/08; G02B 7/04; G02B 27/646; G01D 5/34715;
(Continued)

(56) References Cited

U.S. PATENT DOCUMENTS

| 4,330,775 A | 5/1982 | Iwamoto et al. |
| 4,736,187 A | 4/1988 | Kibrick et al. |

(Continued)

FOREIGN PATENT DOCUMENTS

| CN | 1773215 A | 5/2006 |
| DE | 10349327 A1 | 5/2004 |

(Continued)

OTHER PUBLICATIONS

Extended European Search Report issued in European Appln. No. 15201183.9 dated May 3, 2016.
(Continued)

*Primary Examiner* — Matthew C Bella
*Assistant Examiner* — Dennis Rosario
(74) *Attorney, Agent, or Firm* — Rossi, Kimms & McDowell LLP

(57) ABSTRACT

A position detection apparatus (100) which detects a position of an object includes a scale (2) including a periodic pattern, a detector (7) configured to be movable relative to the scale, and a signal processor (101) configured to acquire position information of the object based on a first output signal from the detector and perform abnormality determination based on a second output signal from the detector, a spatial frequency response of the first output signal is peaked at a first spatial frequency, and a spatial frequency response of the second output signal is peaked at a second spatial frequency different from the first spatial frequency.

29 Claims, 14 Drawing Sheets

(51) Int. Cl.
- G06K 9/03 (2006.01)
- G01D 5/347 (2006.01)
- G06K 9/20 (2006.01)
- G06T 7/20 (2017.01)
- G01D 5/244 (2006.01)

(52) U.S. Cl.
CPC ............ G06K 9/209 (2013.01); G06T 7/0006 (2013.01); G06T 7/20 (2013.01); G06T 7/70 (2017.01); *G01D 5/2448* (2013.01)

(58) Field of Classification Search
CPC .......... G01D 5/34792; G01D 5/24476; G01D 5/34776; G01D 5/34707; G01D 5/34746; G01D 5/347; G01D 5/2458; G01D 5/24438; G01D 5/3473; G06T 7/001; G06T 7/0004
See application file for complete search history.

(56) References Cited

U.S. PATENT DOCUMENTS

| | | | |
|---|---|---|---|
| 5,742,378 A | 4/1998 | Kumagai et al. | |
| 7,394,925 B2* | 7/2008 | Hayashida | A61B 6/583 378/62 |
| 8,425,003 B2* | 4/2013 | Nakata | B41J 19/207 347/19 |
| 8,493,572 B2 | 7/2013 | Milvich | |
| 9,030,591 B2* | 5/2015 | Jenkin | H04N 5/23212 348/345 |
| 9,354,089 B2* | 5/2016 | Nagura | G01D 5/34746 |
| 9,633,418 B2* | 4/2017 | Sugimoto | G06T 5/003 |
| 2011/0273725 A1 | 11/2011 | Milvich | |
| 2012/0018626 A1* | 1/2012 | Nagura | G01D 5/34784 250/232 |
| 2012/0217383 A1* | 8/2012 | Horiguchi | G01D 5/34715 250/231.1 |
| 2012/0262731 A1* | 10/2012 | Nagura | G01D 5/34746 356/616 |
| 2012/0265484 A1* | 10/2012 | Nagura | G01D 5/34746 702/150 |
| 2014/0043526 A1 | 2/2014 | Noguchi | |

FOREIGN PATENT DOCUMENTS

| | | |
|---|---|---|
| EP | 0017371 A1 | 10/1980 |
| EP | 0576004 A1 | 12/1993 |
| EP | 2385354 A2 | 11/2011 |
| JP | 10300518 A | 11/1998 |
| JP | 2004144667 A | 5/2004 |
| JP | 2013033058 A | 2/2013 |
| JP | 2014219233 A | 11/2014 |

OTHER PUBLICATIONS

Office Action issued in Chinese Application No. 201510932843.X dated Aug. 31, 2017. English translation provided.

Office Action Issued in Japanese Appln. No. 2014-256842 dated Jun. 5, 2018. English Translation provided.

* cited by examiner

POSITION DETECTION APPARATUS, LENS APPARATUS, IMAGE PICKUP SYSTEM, MACHINE TOOL APPARATUS, POSITION DETECTION METHOD, AND NON-TRANSITORY COMPUTER-READABLE STORAGE MEDIUM WHICH ARE CAPABLE OF DETECTING ABNORMALITY

BACKGROUND OF THE INVENTION

Field of the Invention

The present invention relates to a position detection apparatus which detects a position of an object.

Description of the Related Art

Previously, an encoder is used as a position detection apparatus provided in a machine tool, an FA equipment, or the like. In the encoder, a position detection accuracy is deteriorated due to abnormality such as adherence of a foreign substance on a scale and a defect of a scale pattern. If the deterioration of the position detection accuracy cannot be recognized, there is a possibility that an error operation of a system is generated.

Japanese Patent Laid-open No. H10-300518 discloses an encoder which detects displacement information of an object, and also discloses a signal abnormality detection circuit which detects abnormality of a signal based on information of each of an alternating-current component and a direct-current component contained in a periodic signal.

However, the configuration of Japanese Patent Laid-open No. H10-300518 tends to be affected by a variation of a light intensity, and accordingly it is difficult to perform highly-accurate determination.

SUMMARY OF THE INVENTION

The present invention provides a position detection apparatus, a lens apparatus, an image pickup system, a machine tool apparatus, a position detection method, and a non-transitory computer-readable storage medium which are capable of detecting abnormality such as adherence of foreign substance onto a scale and a defect of a scale pattern with high accuracy.

A position detection apparatus as one aspect of the present invention detects a position of an object, and includes a scale including a periodic pattern, a detector configured to output a first output signal and a second output signal, the detector and the scale being relatively movable each other, and a signal processor configured to acquire position information of the object based on the first output signal from the detector and perform abnormality determination based on the second output signal from the detector, a spatial frequency response of the first output signal is peaked at a first spatial frequency, and a spatial frequency response of the second output signal is peaked at a second spatial frequency different from the first spatial frequency.

A lens apparatus as another aspect of the present invention includes a lens movable in an optical axis direction and the position detection apparatus configured to detect a position of the lens.

An image pickup system as another aspect of the present invention includes the lens apparatus, and an image pickup apparatus including an image pickup element configured to photoelectrically convert an optical image formed via the lens.

A machine tool apparatus as another aspect of the present invention includes a machine tool including at least one of a robot arm and a conveyer configured to convey an object to be assembled, and the position detection apparatus configured to detect at least one of a position and an attitude of the machine tool.

A position detection method as another aspect of the present invention is a method of detecting a position of an object which moves integrally with one of a scale or a detector based on an output signal from the detector, the scale including a periodic pattern, the detector being configured to output a first output signal and a second output signal, and the detector and the scale being relatively movable each other, and the method includes the steps of acquiring position information of the object based on a first output signal from the detector, and performing abnormality determination based on a second output signal from the detector, a spatial frequency response of the first output signal is peaked at a first spatial frequency, and a spatial frequency response of the second output signal is peaked at a second spatial frequency different from the first spatial frequency.

A non-transitory computer-readable storage medium storing a program which causes a computer to execute the position detection method.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
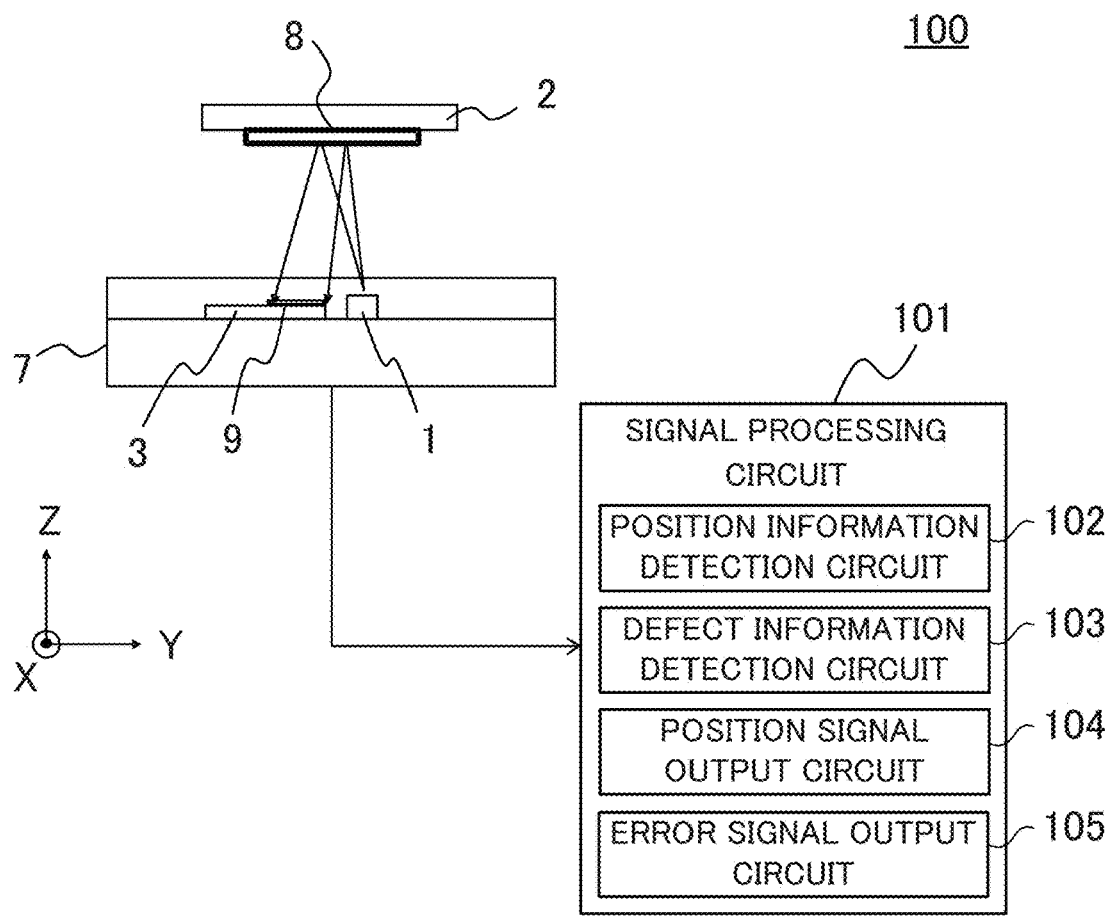
FIG. 1 is a configuration diagram of a position detection apparatus (optical encoder) in each of first and second embodiments.

First of all, referring to FIG. 1, a position detection apparatus (optical encoder) in a first embodiment of the present invention will be described. FIG. 1 is a configuration diagram of a position detection apparatus 100 in this embodiment. The position detection apparatus 100 is an incremental encoder.

The position detection apparatus 100 includes a scale 2 attached to a movable portion, a sensor unit 7 (detector) attached to a fixed portion, and a signal processing circuit 101 (signal processor). The signal processing circuit 101 includes a position information detection circuit 102, a defect information detection circuit 103, a position signal output circuit 104, and an error signal output circuit 105. The position information detection circuit 102 detects an encoder signal (position information) obtained by the sensor unit 7 and performs interpolation processing on the encoder signal to generate a position signal. The defect information detection circuit 103 detects defect information (error information) of the scale 2. The position signal output circuit 104 outputs the position signal generated by the position information detection circuit 102. The error signal output circuit 105 outputs an error signal based on a result of detection by the defect information detection circuit 103.

The sensor unit 7 is a light emitting and receiving sensor unit which includes a light source 1 including for example an LED and a light receiving IC 3 including a light receiving element array 9 mounted in a package. The scale 2 is provided with a chromium reflection film as a scale track 8 formed (patterned) on a glass substrate. A divergent light beam emitted from the light source 1 in the sensor unit 7 is illuminated on the scale track 8 of the scale 2. The light beam reflected by the scale track 8 is reflected toward the light receiving element array 9 in the sensor unit 7. The light beam is received as a double-sized image of a reflectance distribution of the scale track 8 on the light receiving element array 9. The light beam received by the light receiving element array 9 is converted into an electric signal, and it is sent to the signal processing circuit 101 as an encoder signal.

Figure 2:
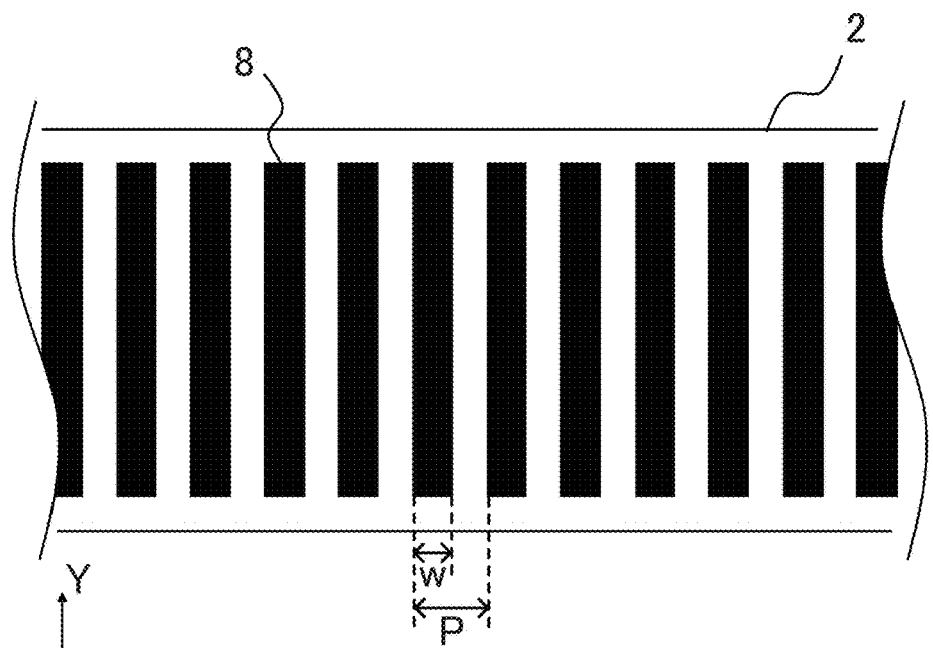
FIG. 2 is a plan view of a scale in the first embodiment.

Subsequently, referring to FIG. 2, the configuration of the scale track 8 of the scale 2 will be described. FIG. 2 is a plan view (enlarged view) of a part of the scale 2 (scale track 8). The scale track 8 is provided with a pattern array where reflection film patterns with a width W (=64 μm) are arranged at each pitch P (=128 μm).

Figure 3:
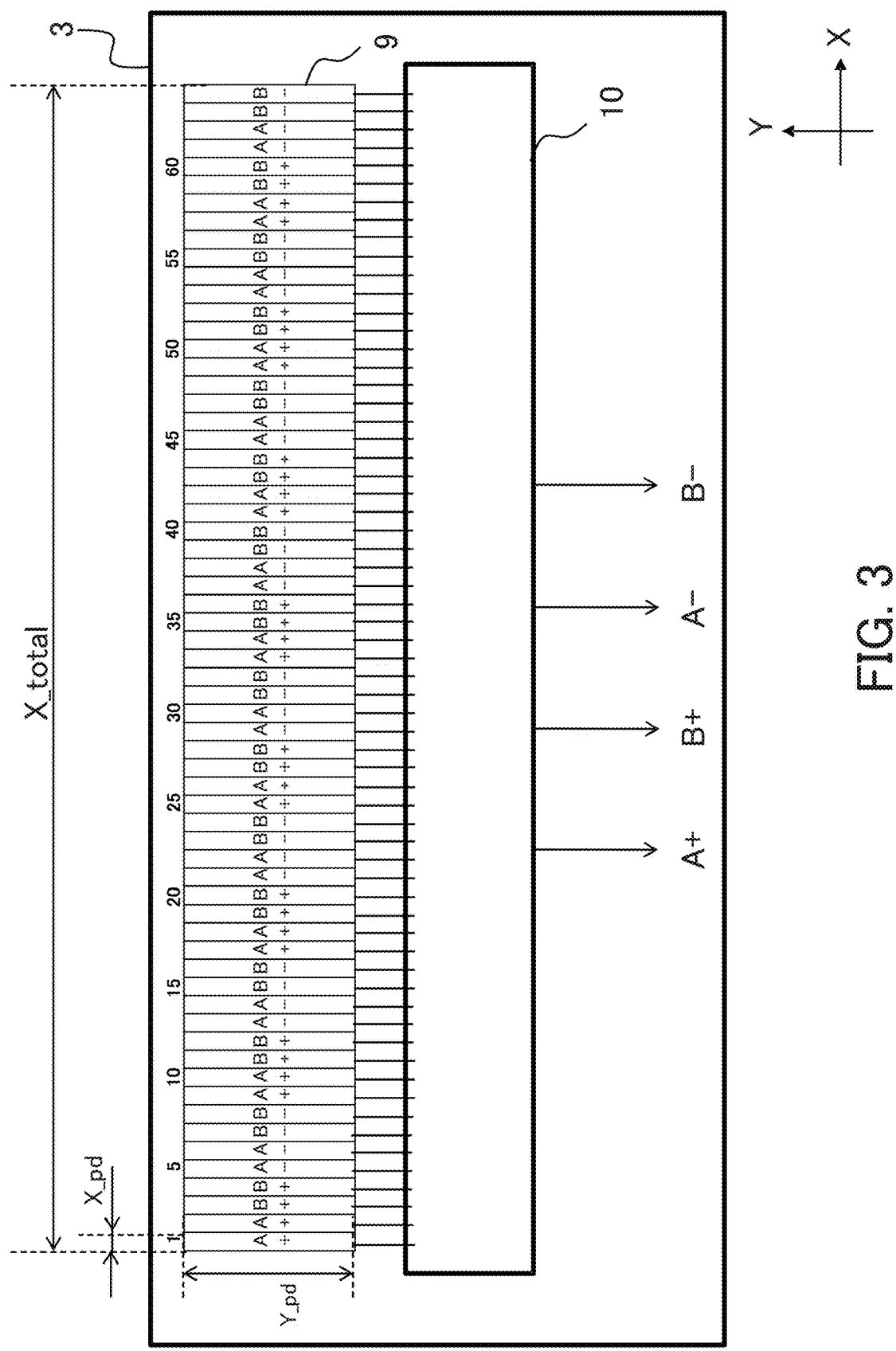
FIG. 3 is a plan view of a light receiving element array of a light receiving IC in the first embodiment (first combination).
Figure 4:
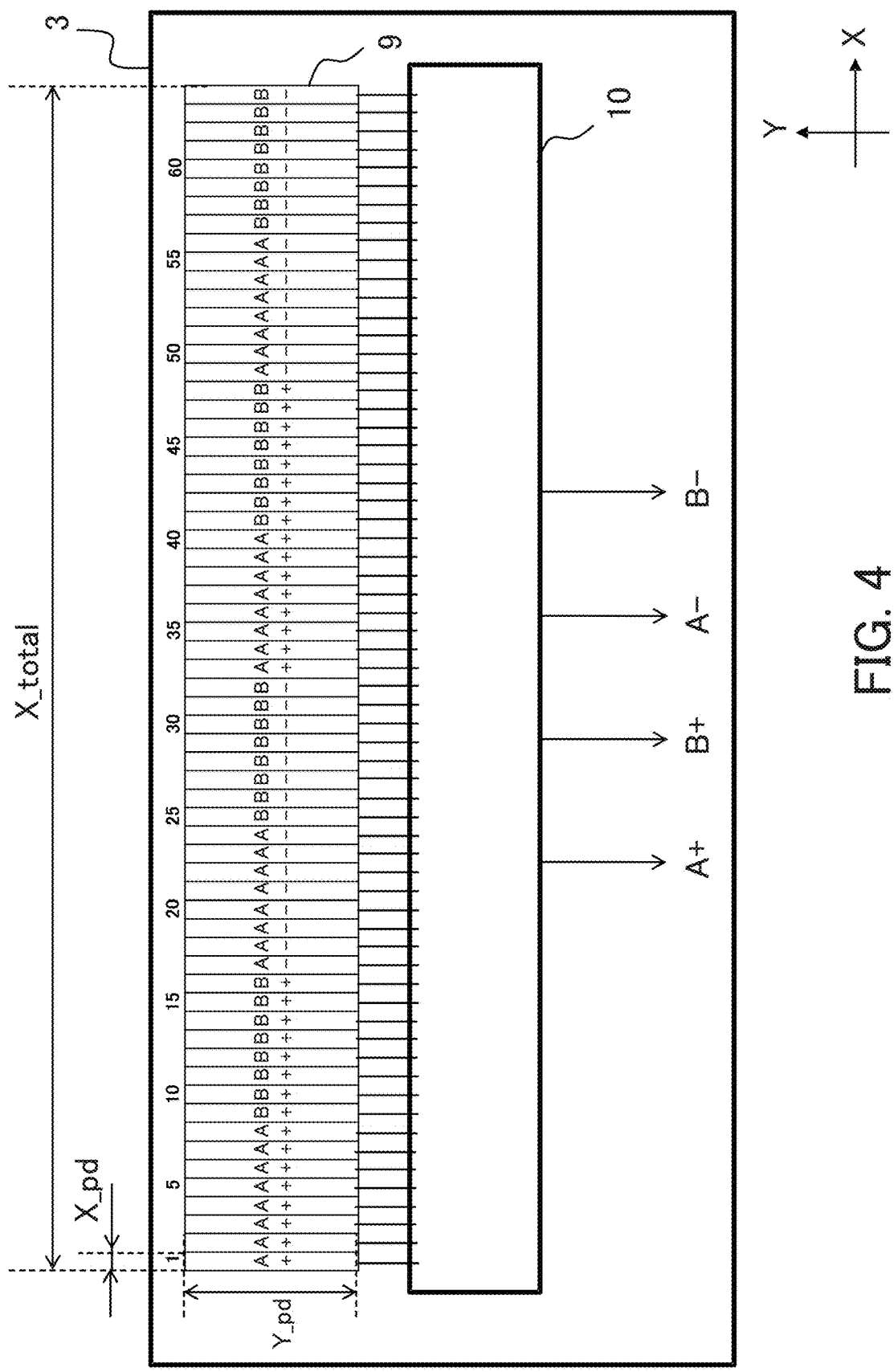
FIG. 4 is a plan view of the light receiving element array of the light receiving IC in the first embodiment (second combination).

Subsequently, referring to FIGS. 3 and 4, the configuration of the light receiving element array 9 of the light receiving IC 3 will be described. FIGS. 3 and 4 are plan views of the light receiving element array 9 and illustrate arrangements of light receiving surfaces of the light receiving element array 9 in a first combination and a second combination, respectively. In the light receiving element array 9, 64 light receiving elements are arrayed in an X direction at a pitch of 32 μm. With respect to a single light receiving element, a width X_pd in the X direction is 32 μm and a width Y_pd in a Y direction is 800 μm.

An output of each of the light receiving elements is switched by a switch circuit 10, and is selectively connected to four initial stage amplifiers (not illustrated) at the latter stage. The four initial stage amplifiers are connected to the light receiving elements corresponding to four phases of A+, B+, A−, and B−, and the switch circuit 10 outputs a four-phase signal (signals S(A+), S(B+), S(A−), and S(B−)) to the respective four initial stage amplifiers. The switch circuit 10 can switch a connecting destination based on an input signal from the signal processing circuit 101. For example, when the input signal from the signal processing circuit 101 to the switch circuit 10 is at a high level, the connection is switched as illustrated in FIG. 3 and thus a detection pitch corresponds to an image period 256 μm on a detector (light receiving IC 3). In other words, the detection pitch corresponding to a pitch P (=128 μm) of the scale pattern 8 is set. On the other hand, when the input signal from the signal processing circuit 101 to the switch circuit 10 is at a low level, the connection is switched as illustrated in FIG. 4.

The signal processing circuit 101 performs calculation (signal processing) represented by the following expressions (1) and (2) on the four-phase signals S(A+), S(B+), S(A−), and S(B−) to generate two-phase sinusoidal signals S(A) and S(B) from which a direct-current component has been removed.

$$S(A)=S(A+)-S(A-) \quad (1)$$

$$S(B)=S(B+)-S(B-) \quad (2)$$

In this embodiment, sinusoidal signals S(A) and S(B) obtained when the input signal to the switch circuit 10 is at the high level are denoted by S1(A) and S1(B), respectively, and S1(A) and S1(B) are collectively referred to as a first output signal. Sinusoidal signals S(A) and S(B) obtained when the input signal to the switch circuit 10 is at the low level are denoted by S2(A) and S2(B), respectively, and S2(A) and S2(B) are collectively referred to as a second output signal.

In this case, a phase signal Φ1 as a base of a position signal is acquired by calculation represented by the following expression (3).

$$\Phi 1 = A\ \text{TAN}\ 2[S1(A),S1(B)] \quad (3)$$

In expression (3), symbol ATAN 2[Y,X] is an arctangent function that determines a quadrant to convert the phase into a phase of 0 to 2π. The position signal can be acquired by performing known increment processing by using the phase signal Φ1. In the signal processing circuit 101, the position information detection circuit 102 generates the position signal, and the position signal output circuit 104 outputs the generated position signal to an external device.

The defect information detection circuit 103 acquires a pattern defect signal D by performing calculation represented by the following expression (4) using the sinusoidal signals S2(A) and S2(B).

$$D=\sqrt{S2(A)^2+S2(B)^2} \quad (4)$$

When the pattern defect signal D exceeds a predetermined threshold value Dth, the error signal output circuit 105 outputs an error signal E.

Figure 5:
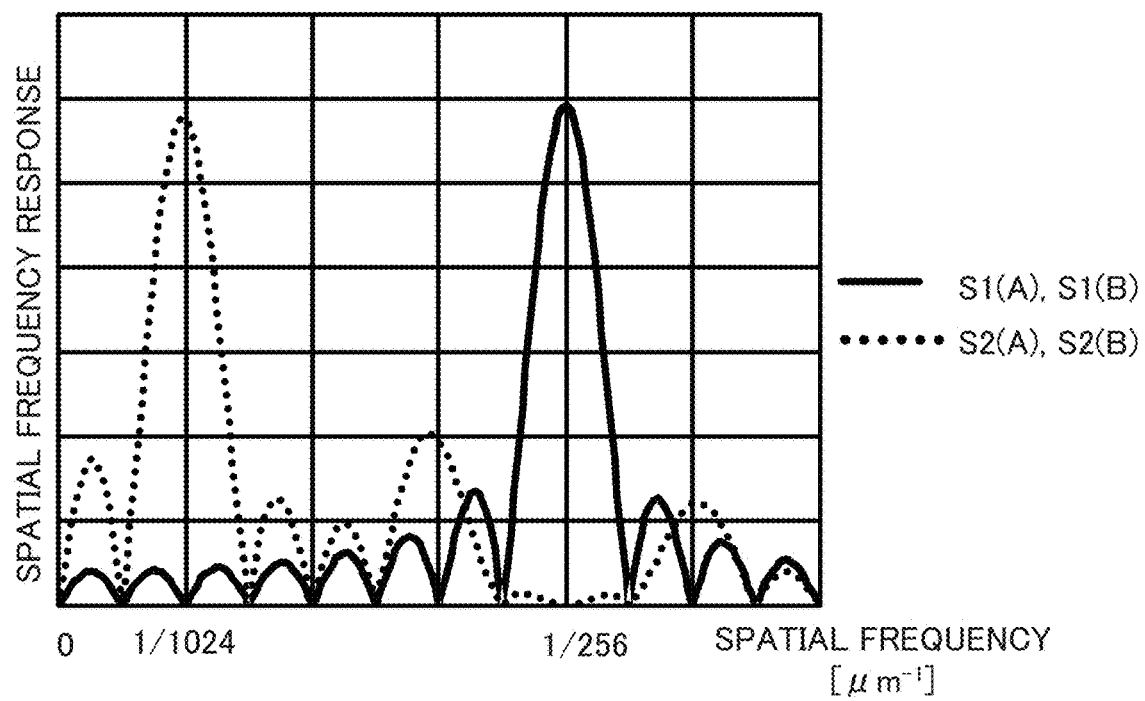
FIG. 5 is a diagram of illustrating spatial frequency responses of signals S1(A), S1(B), S2(A), and S2(B) in the first embodiment.

FIG. 5 is a diagram of illustrating spatial frequency responses of signals S1(A), S1(B), S2(A), and S2(B) on the surface of the detector (light receiving IC 3). A spatial frequency response (indicated by a solid line) with respect to the signals S1(A) and S1(B) is peaked (maximized) at a first spatial frequency (=1/256 [μm$^{-1}$]) corresponding to a reflected image of a pitch P (=128 [μm]) of the scale pattern 8. The spatial frequency response with respect to the signals S1(A) and S1(B) has a sinusoidal waveform with a pattern period to be modulated according to the movement of the movable portion.

On the other hand, a spatial frequency response (indicated by a dotted line) with respect to the signals S2(A) and S2(B) is peaked (maximized) at a second spatial frequency (=1/1024 [μm$^{-1}$]). The spatial frequency response with respect to the signals S2(A) and S2(B) is small (preferably, minimized) at the first spatial frequency (=1/256 [μm$^{-1}$]), and thus an output modulation according to the movement of the movable portion is minute. Actually, however, due to a manufacturing error or an error of an image magnification, there is a possibility that a small response to an image periodic component of the scale pattern exists. In this case, for example, the response of the pattern defect signal D is suppressed to be not greater than 10% of a response of a position signal, and thus a practical defect detection accuracy is obtained. More preferably, in order to determine a defect which influences a position accuracy, the response of the pattern defect signal D is reduced to be not greater than 5% of the response of the position signal.

The characteristic of the spatial frequency response can be realized by performing differential calculation of in-phase components with respect to an image having a scale pattern period (pitch P) on the surface of the detector (light receiving IC 3). In this embodiment, as illustrated in FIG. 4, the differential calculation is performed on outputs of the in-phase components from light receiving elements, which are arranged at a pitch of 512 μm (twice as wide as a pitch of an image of the scale pattern period) on the surface of the detector. Alternatively, it can be realized by integrating the image of the scale pattern period within a period, or by adding reverse phase components with respect to the image of the scale pattern period. In this embodiment, as illustrated in FIG. 4, the sum of continuous outputs from light receiving elements arranged at a pitch of 256 μm, which is equal to an image period of the scale pattern period (pitch P), can be obtained.

The spatial frequency response of the signals S2(A) and S2(B) is small (preferably, minimized) also with respect to a direct-current component, i.e., at a spatial frequency of 0 [μm$^{-1}$]. Accordingly, even when the variation of a light intensity of the light source 1 or the change of sensitivity of the detector (light receiving IC 3) occurs, the variation of the output can be reduced. The characteristic of the frequency response can be realized, for example, by performing the differential calculation of the outputs of the light receiving elements having the same area (i.e., the same size).

Figure 6:
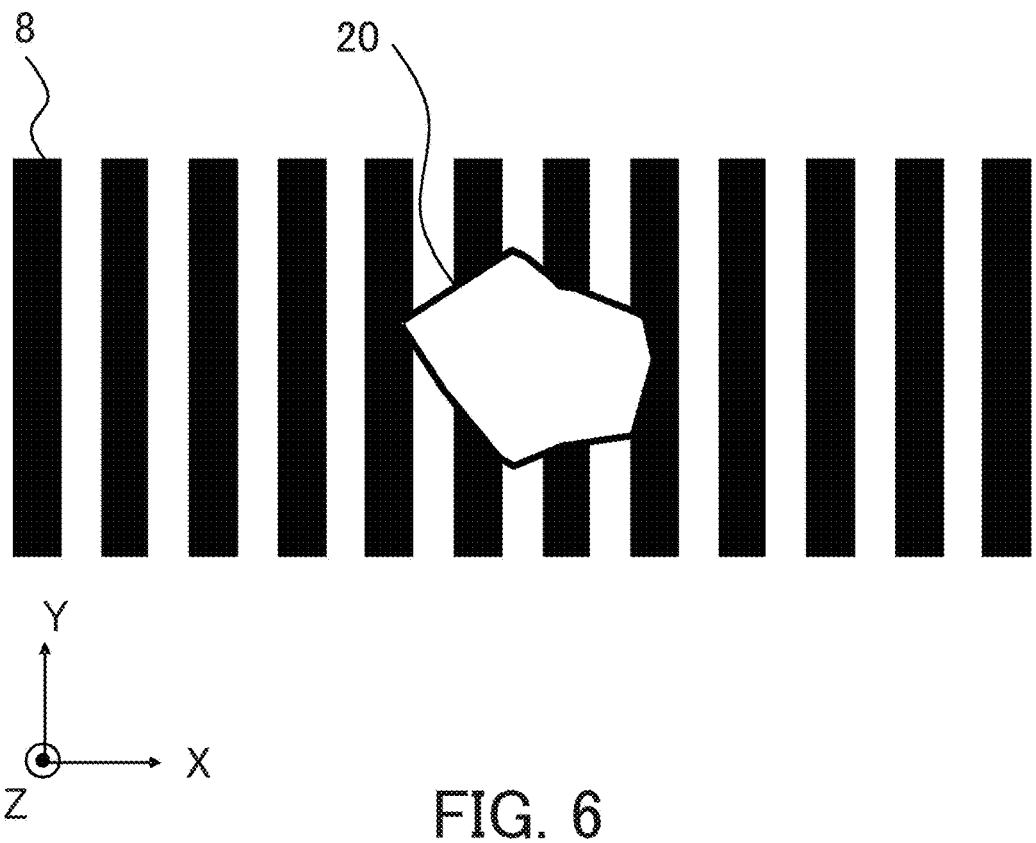
FIG. 6 is a diagram of a defect on a scale pattern in the first embodiment.
Figure 7A:
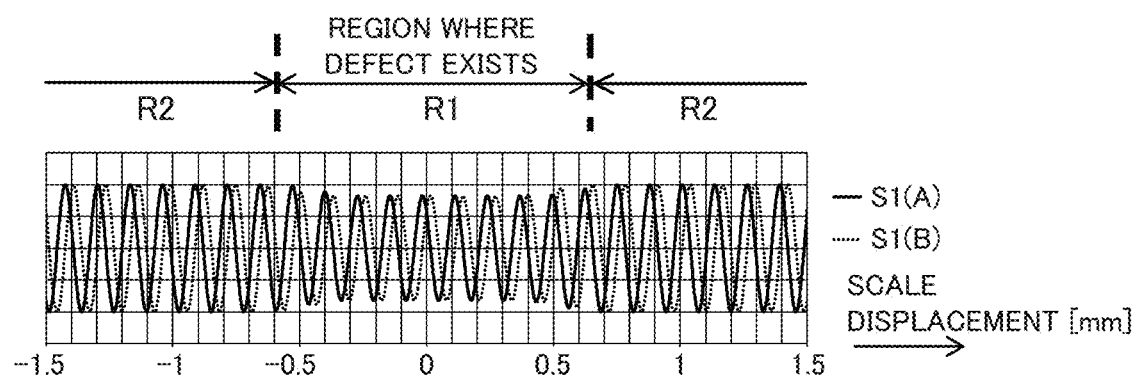
FIGS. 7A to 7D are diagrams of illustrating signals acquired before and after the passage of a defect in the first embodiment.
Figure 7B:
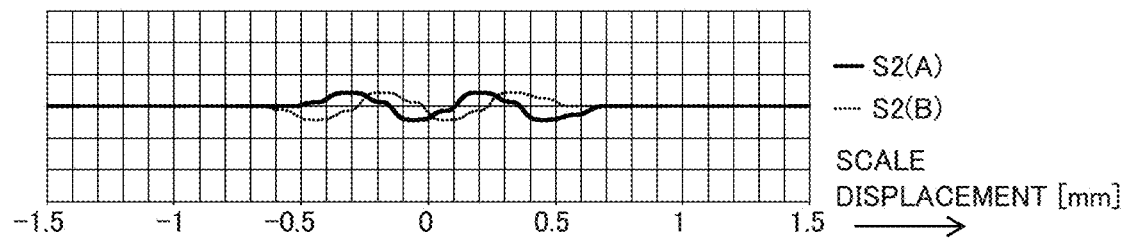
Figure 7C:
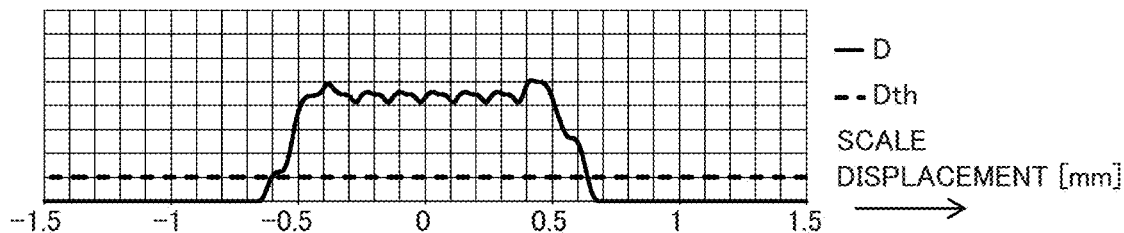
Figure 7D:
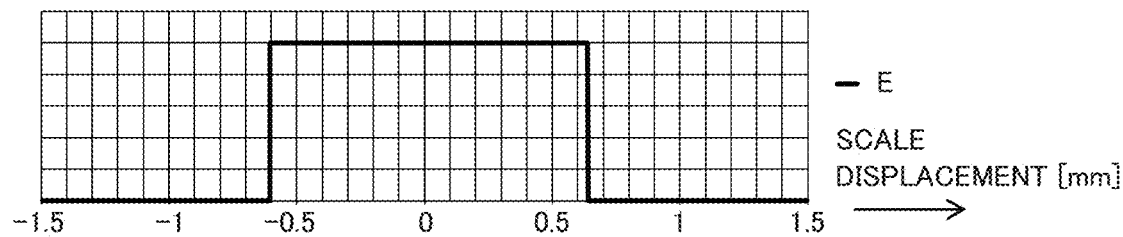

Next, referring to FIGS. 6 and 7A to 7D, a defect (abnormality such as adherence of a foreign substance and a defect of the scale pattern) on the scale pattern 8 will be described. FIG. 6 is a diagram of illustrating a defect 20 on the scale pattern 8. FIGS. 7A to 7D are diagrams of illustrating signals acquired before and after the defect (i.e., before and after the passage of the defect 20). FIG. 7A illustrates signals S1(A) and S1(B), FIG. 7B illustrates signals S2(A) and S2(B), FIG. 7C illustrates a pattern defect signal D and a predetermined threshold value Dth, and FIG. 7D illustrates an error signal E.

As illustrated in FIG. 7A, in a region (region R2) where the defect 20 does not exist, the signals S1(A) and S1(B) have exact sinusoidal waveforms. On the other hand, in a region (region R1) where the defect 20 exists, they approximately have sinusoidal waveforms, but contain some errors as a position signal. As illustrated in FIG. 7B, in the region (region R2) where the defect 20 does not exist, the signals S2(A) and S2(B) indicate approximately constant output values. On the other hand, in the region (region R1) where the defect 20 exists, the waveforms of the signals S2(A) and S2(B) are modulated due to the influence of the defect 20.

As illustrated in FIG. 7C, in the region (region R2) where the defect 20 does not exist, the pattern defect signal D is approximately zero and indicates a constant output. On the other hand, in the region (region R1) where the defect 20 exists, the value of the pattern defect signal D increases. In this embodiment, with respect to the pattern defect signal D, a value which is used for determining abnormality is set as a predetermined threshold value Dth. When the pattern defect signal D exceeds the predetermined threshold value Dth, the defect information detection circuit 103 generates an error signal E, and the error signal output circuit 105 outputs the error signal E to an external device. According to the configuration of this embodiment, whether the defect 20 on the scale 2 is included in a readout region can be determined by using the error signal E.

In this embodiment, as described referring to FIGS. 3 and 4, the electric connection of the light receiving element array 9 is switched by the switch circuit 10 to switch acquisition of the position signal and the defect signal. However, this embodiment is not limited thereto. For example, an I-V conversion amplifier may be connected with each light receiving surface of the light receiving IC 3 to perform the two types of calculations on its outputs. Alternatively, a linear sensor may be used to perform the two types of calculations on an output from each pixel.

As described above, according to this embodiment, a highly-accurate defect determination can be performed by separation from the modulation caused by the scale pattern. Even when an efficiency variation according to an environment variation or the like occurs, scanning is not necessary during the defect determination. This embodiment uses a linear encoder as a position detection apparatus 100, but is not limited thereto, and for example it can be applied also to a rotary encoder. In this case, the scale pattern may be formed radially.

In this embodiment, the optical encoder is used as a position detection apparatus 100, but the embodiment is not limited thereto, and for example a magnetic encoder, a capacitance encoder, or the like can also be used to achieve similar effects. When the magnetic encoder is used, a magnetic material is used for the scale, and the magnetic polarity distribution is formed with a shape similar to that of the reflection film of the scale of this embodiment. A position can be detected by using arrayed magnetic field detection elements provided near this scale. On the other hand, when the capacitance encoder is used, a conductive electrode pattern is formed with a shape similar to that of the reflection film of the scale of this embodiment, and a position can be detected by another arrayed electrode pattern provided oppositely to the conductive electrode pattern.

Second Embodiment

Next, a position detection apparatus in a second embodiment of the present invention will be described. This embodiment relates to a position detection apparatus (absolute encoder) which detects an absolute position of an object.

Figure 8:
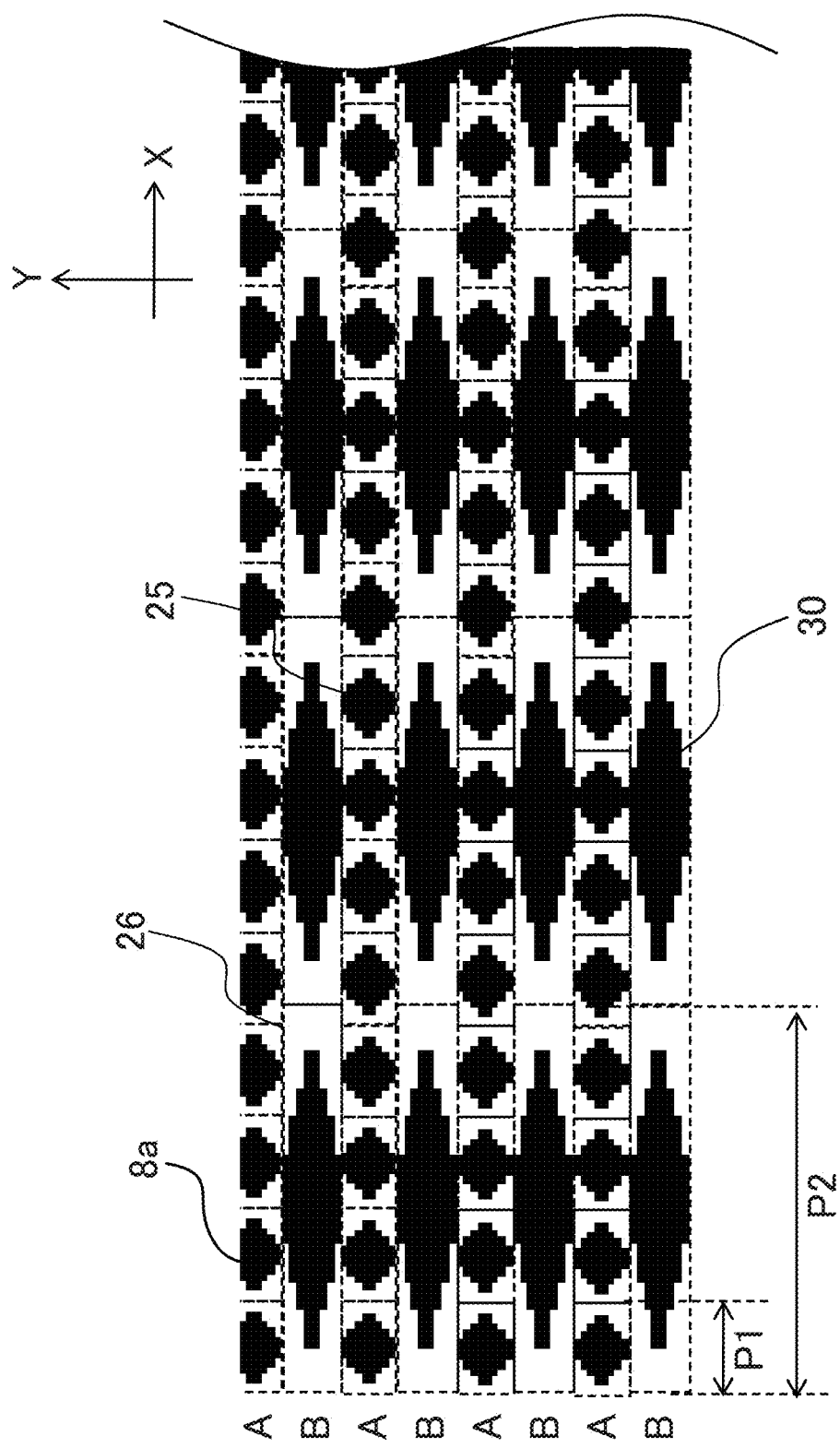
FIG. 8 is a plan view of a scale in the second embodiment.
Figure 9:
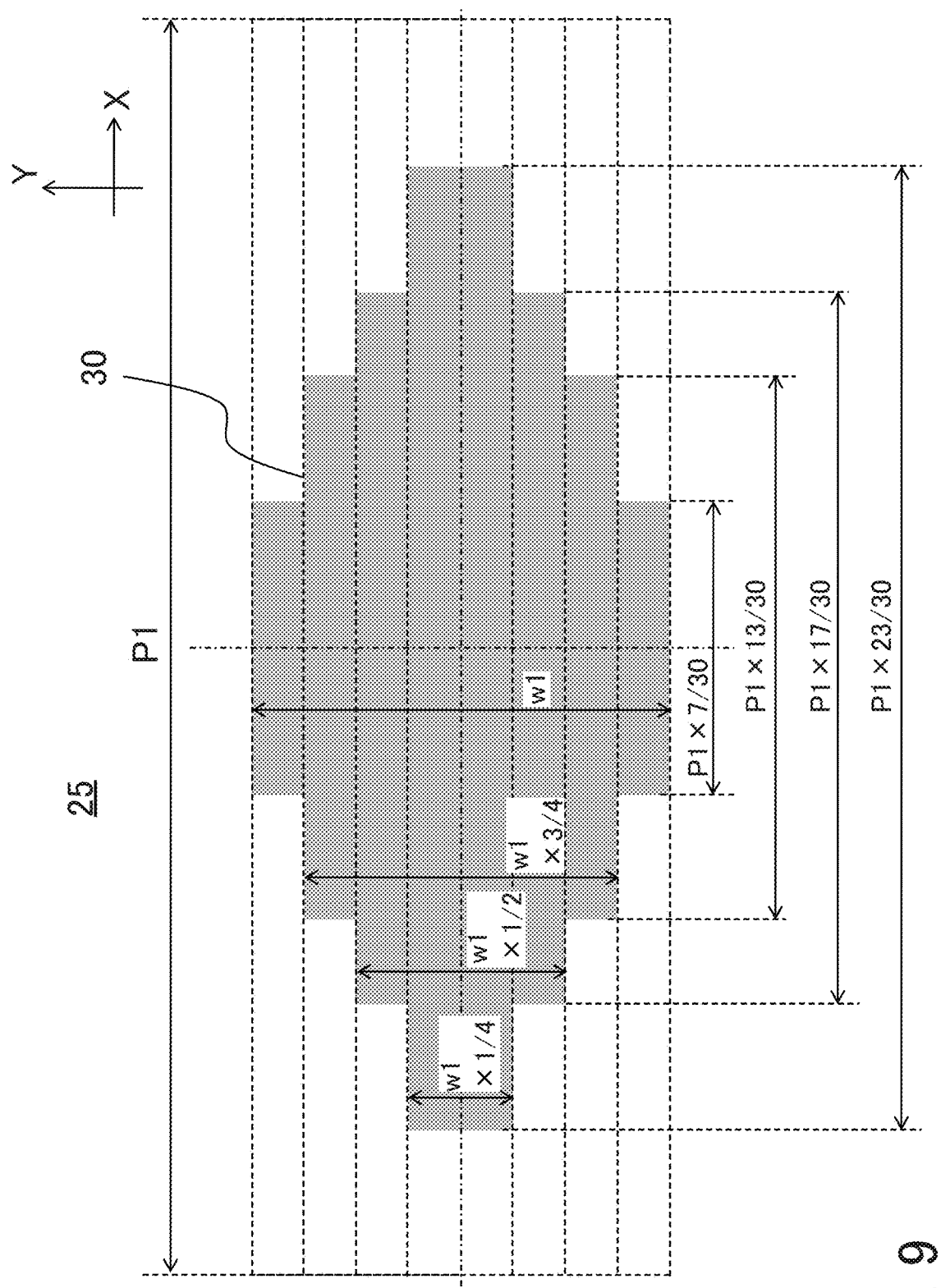
FIG. 9 is an enlarged view of a pattern (region A) on a scale track in the second embodiment.
Figure 10:
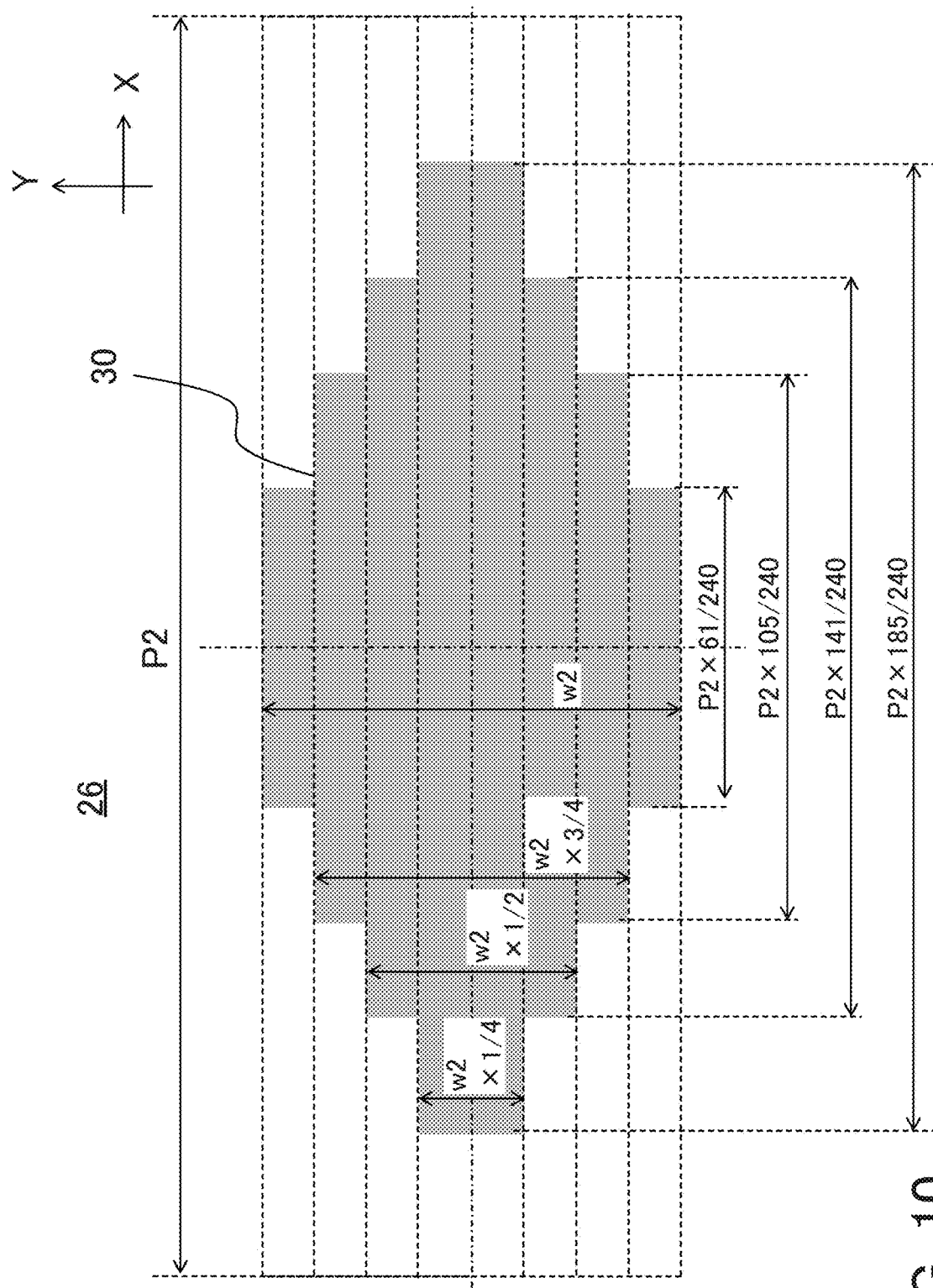
FIG. 10 is an enlarged view of a pattern (region B) on a scale track in the second embodiment.

First, referring to FIGS. 8 to 10, the configuration of a scale track 8a of the scale 2 will be described. FIG. 8 is a plan view (enlarged view) of a part of the scale 2 (scale track 8a). The scale track 8a is provided with two types of regions (regions A and B) alternately arrayed in a direction (Y direction) perpendicular to a moving direction (X direction). FIGS. 9 and 10 are plan views of patterns (regions A and B) of the scale track 8a, and FIGS. 9 and 10 illustrate enlarged views of the regions A and B within a period in the X direction, respectively.

The region A includes a pattern array where patterns 25 illustrated in FIG. 9 are arrayed at each pitch P1 (=128 µm) in the X direction. The region B includes a pattern array where patterns 26 illustrated in FIG. 10 are arrayed at each pitch P2 (=533.333 µm) in the X direction. Widths W1 and W2 of the regions A and B in the Y direction are the same (W1=W2=50 µm).

As illustrated in FIG. 9, the pattern 25 in the region A is configured by a reflection film 30 having a width along the X direction which varies depending on a position in the Y direction. The width of the reflection film 30 in the X direction is P1×23/30 within a region where a distance from a center in the Y direction is less than or equal to W1×1/8. The width of the reflection film 30 in the X direction is P1×17/30 within a region where the distance from the center in the Y direction is from W1×1/8 to W1×1/4. The width of the reflection film 30 in the X direction is P1×13/30 within a region where the distance from the center in the Y direction is from W1×1/4 to W1×3/8. The width of the reflection film 30 in the X direction is P1×7/30 within a region where the distance from the center in the Y direction is from W1×3/8 to W1×1/2.

As illustrated in FIG. 10, with respect to the pattern 26 of the region B, the width of the reflection film 30 in the X direction is P2×185/240 within a region where a distance from a center in the Y direction is less than or equal to W2×1/8. The width of the reflection film 30 in the X direction is P×141/240 within a region where the distance from the center in the Y direction is from W2×1/8 to W2×1/4. The width of the reflection film 30 in the X direction is P P2×105/240 within a region where the distance from the center in the Y direction is from W2×1/4 to W2×3/8. The width of the reflection film 30 in the X direction is P2×61/240 within a region where the distance from the center in the Y direction is from W2×3/8 to W2×1/2.

Figure 11:
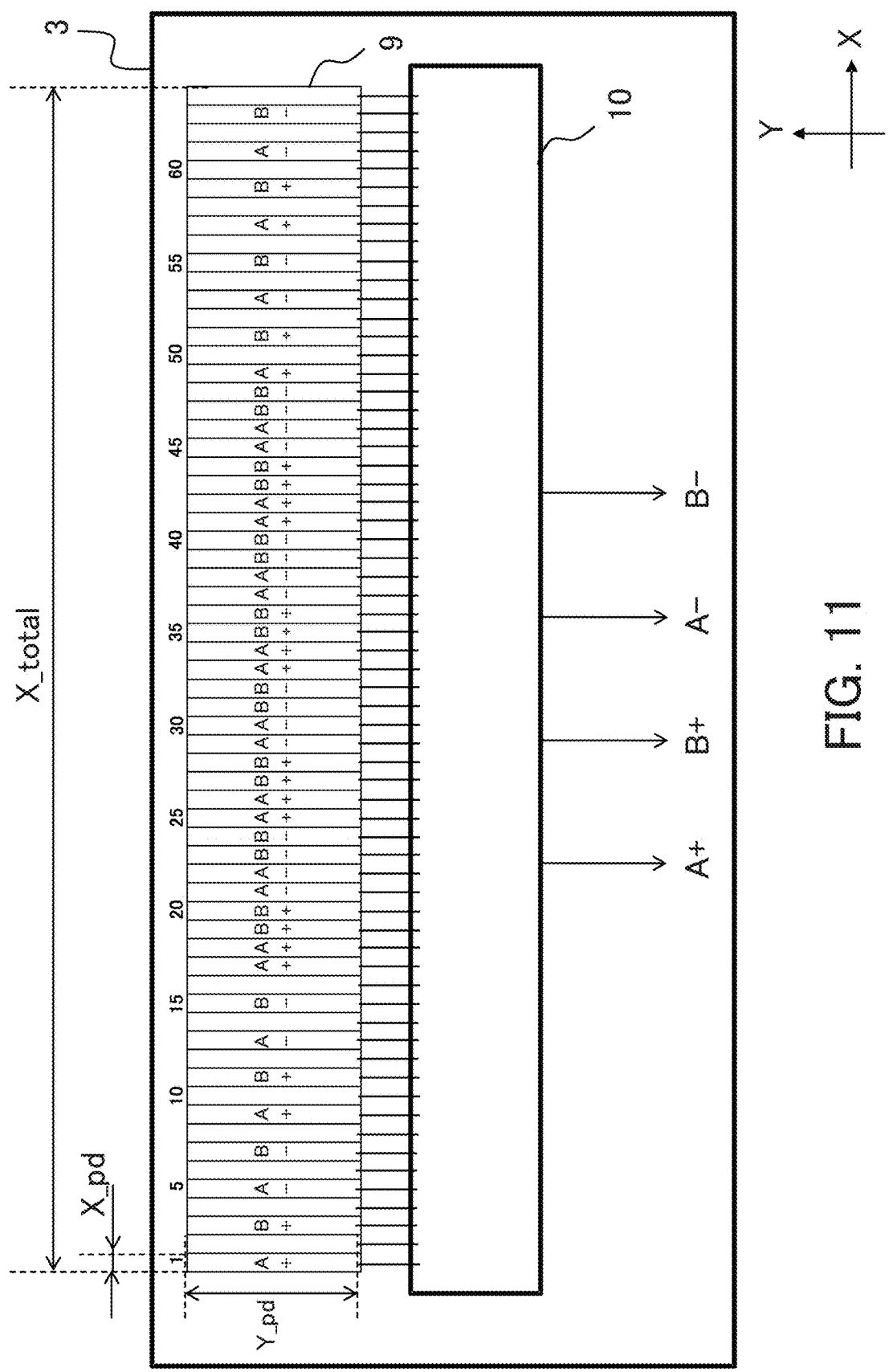
FIG. 11 is a plan view of a light receiving element array of a light receiving IC in the second embodiment (first combination).
Figure 12:
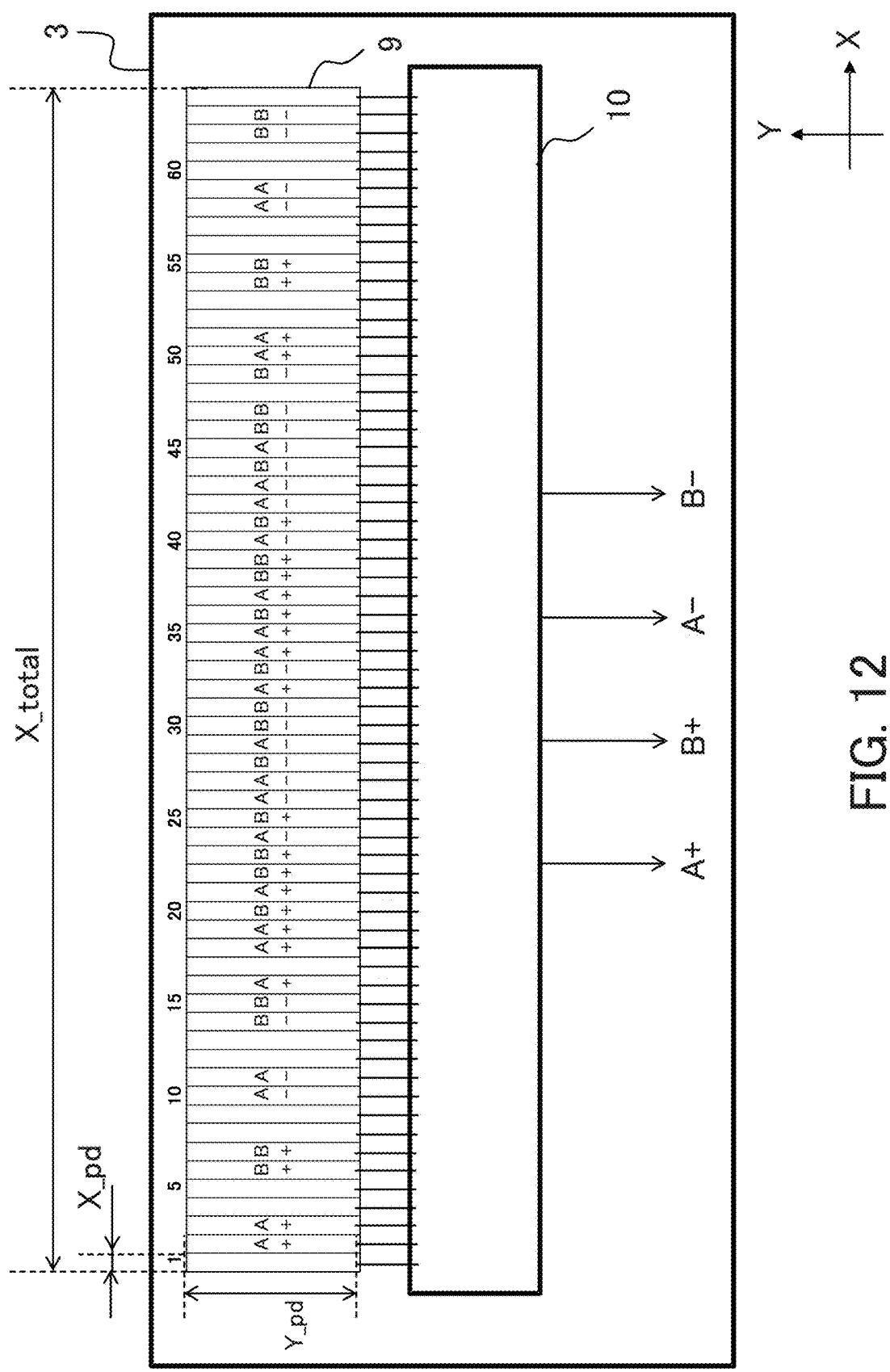
FIG. 12 is a plan view of the light receiving element array of a light receiving IC in the second embodiment (second combination).
Figure 13:
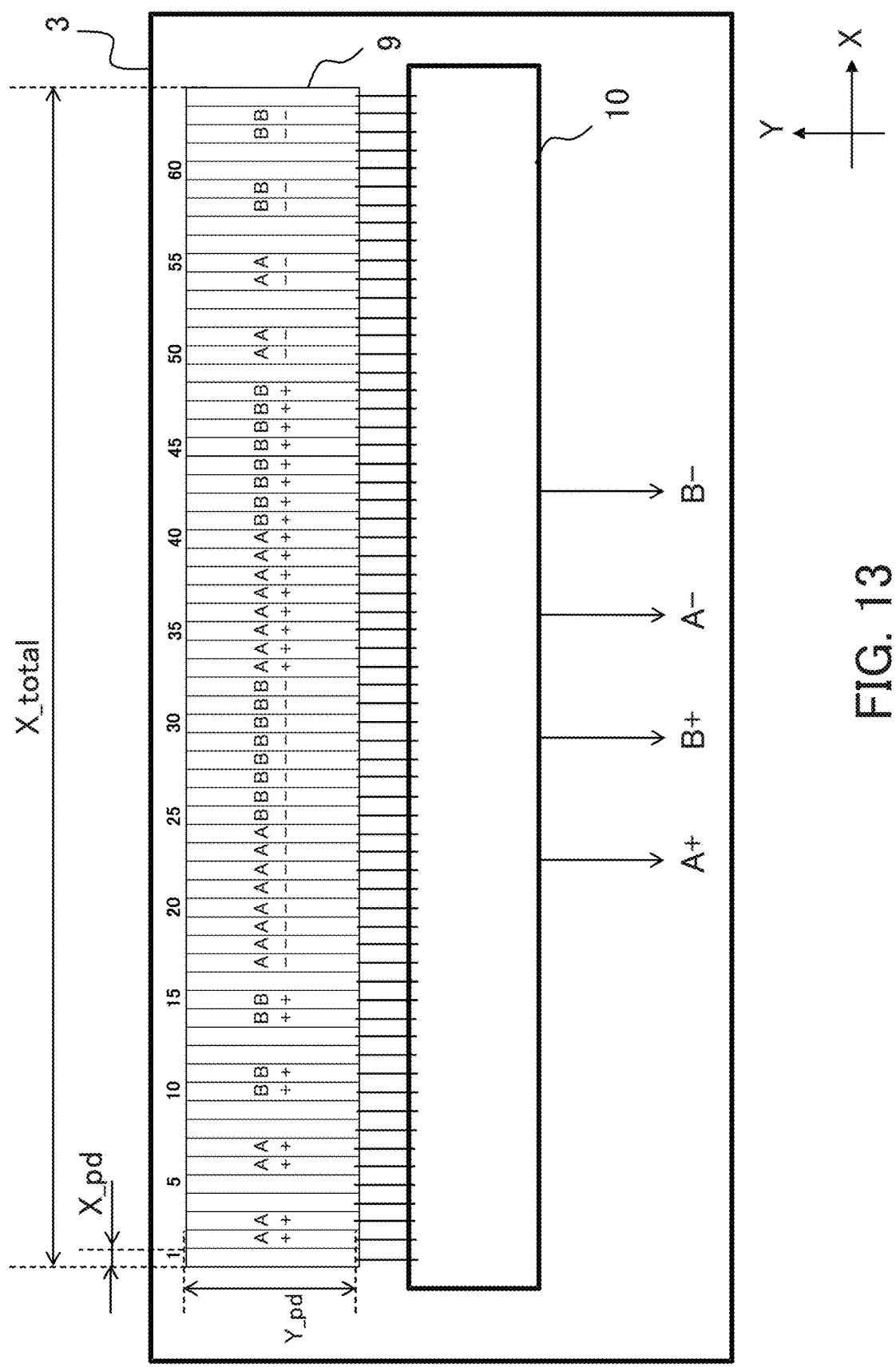
FIG. 13 is a plan view of the light receiving element array of a light receiving IC in the second embodiment (third combination).

Subsequently, referring to FIGS. 11 to 13, the configuration of the light receiving element array 9 of the light receiving IC 3 will be described. FIGS. 11 to 13 are plan views of the light receiving element array 9 and illustrate arrangements of light receiving surfaces of the light receiving element array 9 in first to third combinations, respectively. In the light receiving element array 9, 64 light receiving elements are arrayed in the X direction at a pitch of 32 µm. With respect to a single light receiving element, a width X_pd in the X direction is 32 µm and a width Y_pd in the Y direction is 800 µm.

An output of each of the light receiving elements is switched by a switch circuit 10, and is selectively connected to four initial stage amplifiers (not illustrated) at the latter stage. The four initial stage amplifiers are connected to the light receiving elements corresponding to four phases of A+, B+, A−, and B−, and the switch circuit 10 outputs a four-phase signal (signals S(A+), S(B+), S(A−), and S(B−)) to the respective four initial stage amplifiers. The switch circuit 10 can switch a connecting destination based on an input signal from the signal processing circuit 101.

When the input signal from the signal processing circuit 101 to the switch circuit 10 is at a high level, as illustrated in FIG. 11, a center interval of the light receiving elements electrically connected is 256 µm, and accordingly an image period on the surface of the detector (light receiving IC 3) corresponds to a detection pitch of 256 µm. In other words, the detection pitch corresponds to the pitch P1 (=128 µm) of the scale pattern. When the input signal from the signal processing circuit 101 to the switch circuit 10 is at a low high level, as illustrated in FIG. 12, a center interval of the light receiving elements electrically connected is 512 µm, and accordingly an image period on the surface of the detector corresponds to a detection pitch of 512 µm. When the input signal from the signal processing circuit 101 to the switch circuit 10 is at a middle level, as illustrated in FIG. 13, a center interval of the light receiving elements electrically connected is 1024 µm, and accordingly an image period on the surface of the detector corresponds to a detection pitch of 1024 µm. In other words, the detection pitch corresponds to the pitch P2 (=533.333 µm) of the scale pattern.

The signal processing circuit 101 performs calculation (signal processing) represented by the following expressions (5) and (6) on the four-phase signals S(A+), S(B+), S(A−), and S(B−) to generate two-phase sinusoidal signals S(A) and S(B) from which a direct-current component has been removed.

$$S(A)=S(A+)-S(A-) \quad (5)$$

$$S(B)=S(B+)-S(B-) \quad (6)$$

In this embodiment, sinusoidal signals S(A) and S(B) obtained when the input signal to the switch circuit 10 is at the high level are denoted by S1(A) and S1(B), respectively, and S1(A) and S1(B) are collectively referred to as a first output signal. Sinusoidal signals S(A) and S(B) obtained when the input signal to the switch circuit 10 is at the low level are denoted by S2(A) and S2(B), respectively, and S2(A) and S2(B) are collectively referred to as a second output signal. Sinusoidal signals S(A) and S(B) obtained when the input signal to the switch circuit 10 is at the middle level are denoted by S3(A) and S3(B), respectively, and S3(A) and S3(B) are collectively referred to as a third output signal.

Figure 14:
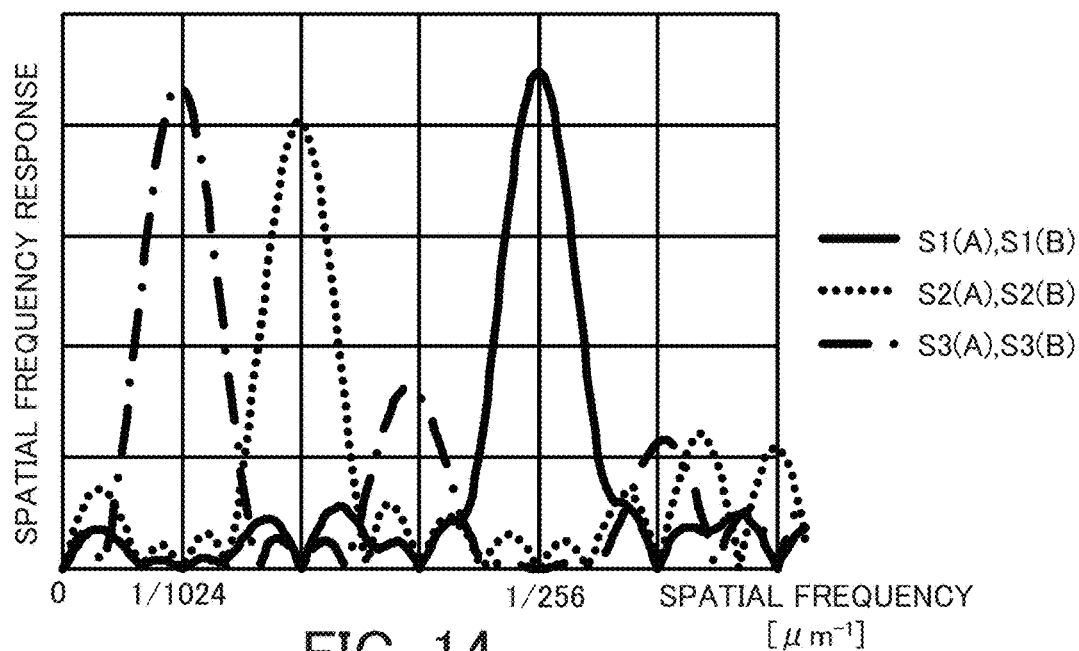
FIG. 14 is a diagram of illustrating spatial frequency responses of signals S1(A), S1(B), S2(A), S2(B), S3(A), and S3(B) in the second embodiment.

FIG. 14 is a diagram of illustrating spatial frequency responses of signals S1(A), S1(B), S2(A), S2(B), S3(A), and S3(B) on the surface of the detector (light receiving IC 3). A spatial frequency response (indicated by a solid line) with respect to the signals S1(A) and S1(B) is peaked (maximized) at a first spatial frequency (=1/256 [µm$^{-1}$]) corresponding to a reflected image of a pitch P1 (−128 [µm]) of the scale pattern 8a. The spatial frequency response with respect to the signals S1(A) and S1(B) has a sinusoidal waveform with a pattern period (pitch P1) to be modulated according to the movement of the movable portion. A spatial frequency response (indicated by a dashed-dotted line) with respect to the signals S3(A) and S3(B) is peaked (maximized) at a third spatial frequency (=1/1066.667 [µm$^{-1}$]) corresponding to a reflected image of a pitch P2 (=533.333 [µm]) of the scale pattern 8a. The spatial frequency response with respect to the signals S3(A) and S3(B) has a sinusoidal waveform with a pattern period (pitch P2) to be modulated according to the movement of the movable portion.

On the other hand, a spatial frequency response (indicated by a dotted line) with respect to the signals S2(A) and S2(B) is peaked (maximized) at a second spatial frequency. The spatial frequency response with respect to the signals S2(A) and S2(B) is small (preferably, minimized) at the first spatial frequency (=1/256 [µm$^{-1}$]) and at the third spatial frequency (=1/1066.667 [µm$^{-1}$]), and thus an output modulation according to the movement of the movable portion is minute. Actually, however, due to a manufacturing error or an error of an image magnification, there is a possibility that a small response to an image periodic component of the scale pattern exists. In this case, for example, the response of the pattern defect signal D is suppressed to be not greater than 10% of a response of a position signal, and thus a practical defect detection accuracy is obtained. More preferably, in order to determine a defect which influences a position accuracy, the response of the pattern defect signal D is reduced to be not greater than 5% of the response of the position signal.

The characteristic of the spatial frequency response can be realized by performing differential calculation of in-phase components with respect to an image having a scale pattern period on the surface of the detector (light receiving IC 3). In this embodiment, as illustrated in FIG. 12, the differential calculation is performed on outputs of the in-phase components of the image period (pitch P1) from light receiving elements, which are arranged at a pitch of 256 µm (i.e., a pitch of the image corresponding to the pitch P1 of the scale pattern) on the surface of the detector. Alternatively, it can be realized by adding reverse phase components. In this embodiment, as illustrated in FIG. 12, the sum of reverse phase outputs of the periodic image having the pitch P2 from light receiving elements arranged at a pitch of 512 µm, which is approximately a half of the periodic image having the pitch P2 of the scale pattern, on the surface of the detector can be calculated. In this configuration, spatial frequency responses to the images with pattern periods P1 and P2 on the scale are simultaneously minimized.

The spatial frequency response of the signals S2(A) and S2(B) is small (preferably, minimized) also with respect to a direct-current component, i.e., at a spatial frequency of 0 [µm$^{-1}$]. Accordingly, even when the variation of a light intensity of the light source 1 or the change of sensitivity of the detector (light receiving IC 3) occurs, the variation of the output can be reduced.

Next, calculation processing during position detection in this embodiment will be described. First, corrections of the signals S3(A) and S3(B) will be described. The detection pitch (1024 µm) of the light receiving elements and the image period (1066.667 µm) on the surface of the detector for the pattern period of the pitch P2 are slightly different. Accordingly, it is preferred that correction processing is performed on a relative phase difference between the two-phase sinusoidal signals S3(A) and S3(B). Hereinafter, the correction processing of the relative phase difference will be described in detail.

The two-phase signals S3(A) and S3(B) containing an error e (error component) of the relative phase difference are represented by the following expressions (7) and (8), respectively, where θ is a phase.

$$S3(A)=\cos(\theta+e/2) \tag{7}$$

$$S3(B)=\sin(\theta-e/2) \tag{8}$$

By obtaining the sum and the difference of the two-phase signals S3(A) and S3(B) using expressions (7) and (8), the error component e can be separated as represented by the following expressions (9) and (10).

$$S3(A)+S3(B)=2\times\cos(\theta-\pi/4)\sin(e/2-\pi/4) \tag{9}$$

$$-S3(A)+S3(B)=2\times\sin(\theta-\pi/4)\cos(e/2-\pi/4) \tag{10}$$

The error e of the relative phase difference is represented by e=(1−1024/1032.258)×π/2 according to a design value. Then, with respect to each of amplitude components 2×sin (e(x)/2−π/4) and 2×cos(e(x)/2−π/4) in expressions (9) and (10), an inverse is multiplied. Thus, as represented by the following expressions (11) and (12), two-phase sinusoidal signals S3(A)' and S3(B)' in which the error e of the relative phase difference has been corrected can be calculated. In expressions (11) and (12), φ=θ−π/4 is satisfied.

$$S3(A)'=(S3(A)+S3(B))/(2\times\sin(e/2-\pi/4))=\cos\varphi \tag{11}$$

$$S3(B)'=(-S3(A)+S3(B))/(2\times\cos(e/2-\pi/4))=\sin\varphi \tag{12}$$

The error e of the relative phase difference may be stored during an initializing operation of the position detection apparatus 100. For example, the amplitude component 2×sin (e(x)/2−π/4) is acquired based on (maximum value-minimum value)/2 of S3(A) and S3(B) within a predetermined range in the X direction. In addition, the amplitude component 2×cos(e(x)/2×π/4) can be obtained based on (maximum value-minimum value)/2 of −S3(A)+S3(B) to be stored. In this case, it is possible to correct influences caused by an error of a mounting height between the light source 1 and the light receiving element array 9 or an error of an image magnification due to a relative inclination between the scale 2 and the sensor unit 7 as well.

The signals S3(A)' and S3(B)' acquired as described above are set to be represented by the following expressions (13) and (14) to perform calculation below.

$$S3(A)=S3(A)' \tag{13}$$

$$S3(B)=S3(B)' \tag{14}$$

A phase signal Φ1 corresponding to a scale pattern period (pitch P1) is acquired by calculation represented by the following expression (15) using the signals S1(A) and S1(B).

$$\Phi1=A\text{ TAN }2[S1(A),S1(B)] \tag{15}$$

In expression (15), symbol ATAN 2[Y,X] is an arctangent function that determines a quadrant to convert the phase into a phase of 0 to 2π. Similarly, a phase signal Φ2 corresponding to a pitch P2 is acquired by calculation represented by the following expression (16) using the signals S3(A) and S3(B).

$$\Phi2=A\text{ TAN }2[S3(A),S3(B)] \tag{16}$$

The defect information detection circuit 103 acquires a pattern defect signal D by performing calculation represented by the following expression (17) using the sinusoidal signals S2(A) and S2(B).

$$D=\sqrt{S2(A)^2+S2(B)^2} \tag{17}$$

When the pattern defect signal D exceeds a predetermined threshold value Dth, the error signal output circuit 105 outputs an error signal E.

In this embodiment, by acquiring each signal without time difference (preferably, at the same time) before and after switching the input signal to the switch circuit 10, the phase signals Φ1 and Φ2 at approximately the same position and the pattern defect signal D can be acquired.

Next, the position information detection circuit 102 acquires a vernier signal Sv by calculation represented by the following expression (18).

$$Sv=\Phi1-4\times\Phi2 \tag{18}$$

In this case, the position information detection circuit 102 repeats calculation of Sv=Sv+2π if Sv<0 is satisfied, and it repeats calculation of Sv=Sv−2π if Sv>2π is satisfied, so that the vernier signal Sv is converted to be within an output range of 0 to 2π.

A period Tv of the vernier signal Sv is represented by the following expression (19).

$$Tv=|P1 \cdot P2/(4 \cdot P1-P2)| \qquad (19)$$

In this embodiment, the period Tv of the vernier signal Sv is equal to 3.2 mm, and it is a stroke in which an absolute position can be detected.

Next, calculation processing to synthesize the signals obtained as described above to detect the absolute position will be described. First, the position information detection circuit 102 synchronizes the vernier signal Sv with the phase signal Φ2 to generate a middle signal M as represented by the following expression (20).

$$M=(2\pi \times ROUND[((Tv/P2 \times Sv-\Phi 2)/(2\pi)]+\Phi 2) \times P2/Tv \qquad (20)$$

In expression (20), symbol ROUND[x] means a function which converts x into an integer closest to x.

Subsequently, the position information detection circuit 102 synchronizes the middle signal M with the phase signal Φ1 to generate an absolute position signal ABS as represented by the following expression (21).

$$ABS=(ROUND[((Tv/P1 \times M-\Phi 1)/(2\pi)]+\Phi 1/(2\pi)) \times P1 \text{ [µm]} \qquad (21)$$

The position information detection circuit 102 acquires the absolute position signal ABS when the position detection apparatus 100 is activated. Hereinafter, the position information detection circuit 102 performs known increment processing by using the phase signal Φ1 to acquire a position signal. The position signal output circuit 104 outputs, to an external device, the position signal obtained by the position information detection circuit 102.

It is assumed that a case where the phase signals Φ1 and Φ2 contain errors due to the influence of the defect on the pattern.

The errors of the phase signals Φ1 and Φ2 are denoted by ΔΦ1 and ΔΦ2, respectively. When a range represented by the following expression (22) is satisfied in expression (20), a position detection error is large since a wavenumber count of the periodic signal with the pitch P2 is erroneously detected.

$$|(\Delta \Phi 1-4 \times \Delta \Phi 2)-\Delta \Phi 1|>\pi \qquad (22)$$

Figure 15A:
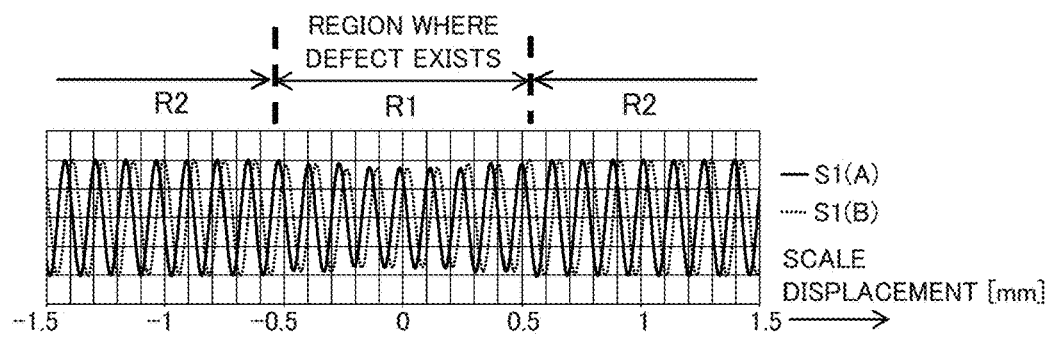
FIGS. 15A to 15C are diagrams of illustrating signals acquired before and after the passage of a defect in the second embodiment.
Figure 15B:
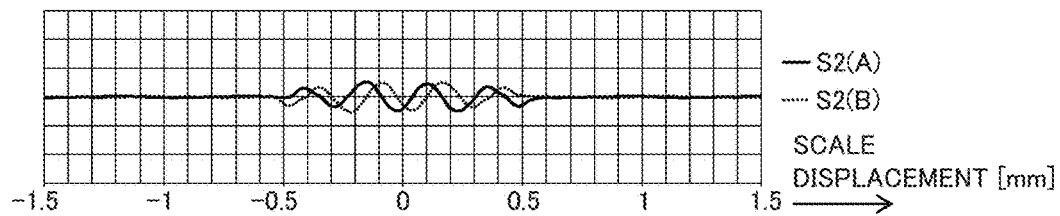
Figure 15C:
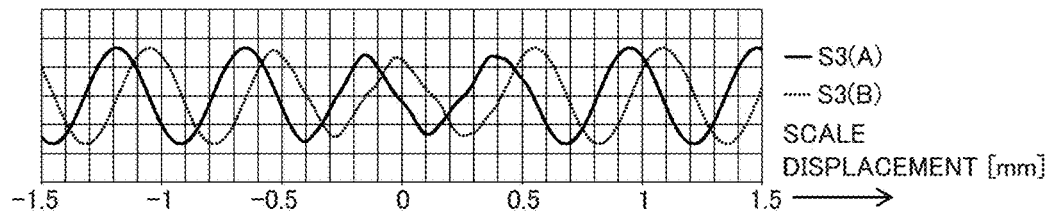
Figure 16A:
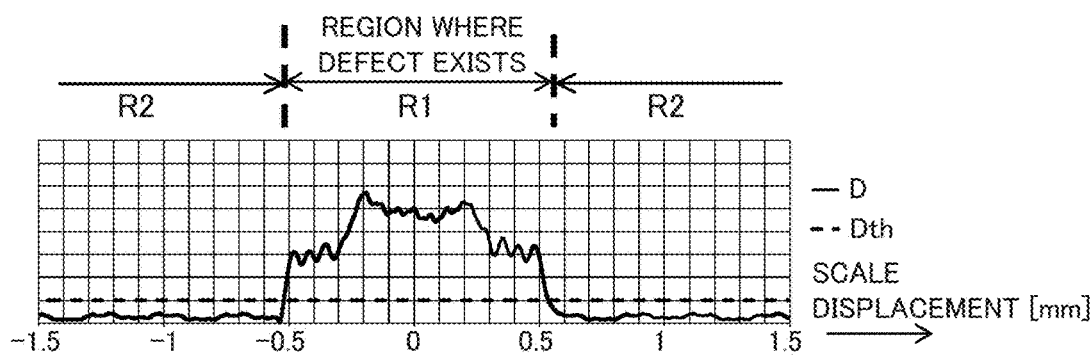
FIGS. 16A to 16D are diagrams of illustrating signals acquired before and after the passage of the defect in the second embodiment.
Figure 16B:
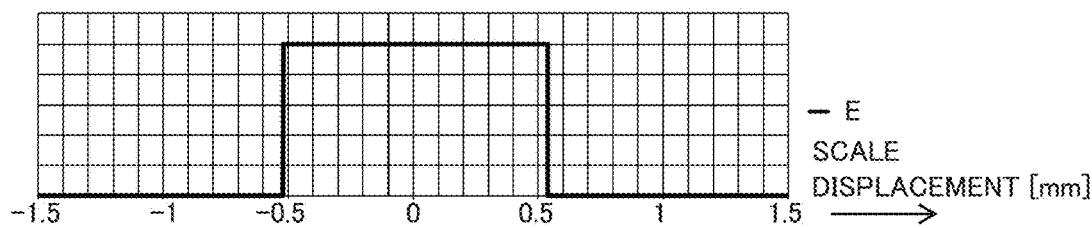
Figure 16C:
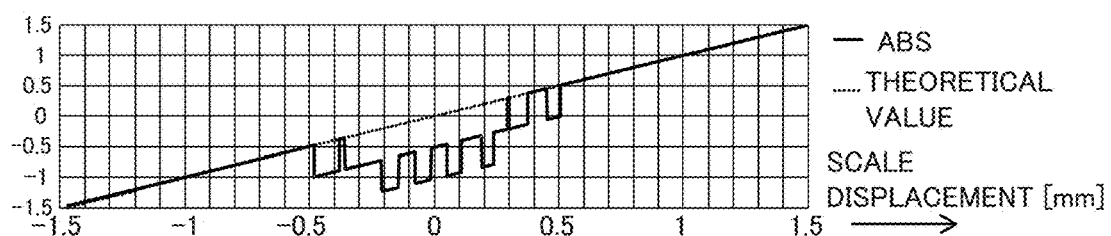
Figure 16D:
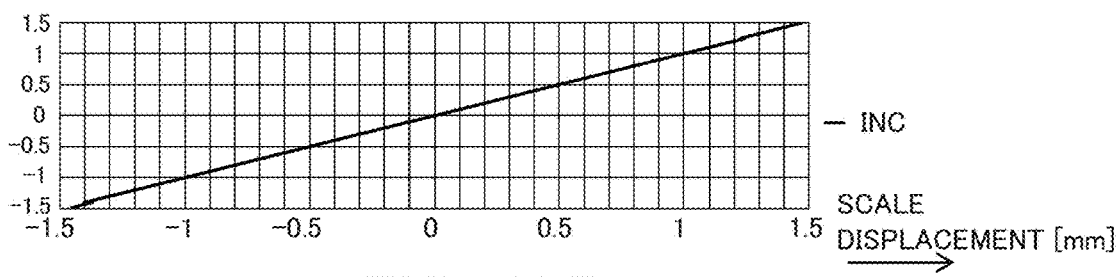

FIGS. 15A to 15C and FIGS. 16A to 16D are diagrams of illustrating signals before and after the passage of the defect in this embodiment. FIG. 15A illustrates the signals S1(A) and S1(B), FIG. 15B illustrates the signals S2(A) and S2(B), and FIG. 15C illustrates the signals S3(A) and S3(B). FIG. 16A illustrates the pattern defect signal D and the predetermined threshold value Dth, FIG. 16B illustrates the error signal E, FIG. 16C illustrates the absolute position signal ABS and its theoretical value, and FIG. 16D illustrates a position signal INC obtained by increment detection using the phase signal Φ1.

In the region (region R1) where the defect exists, the absolute position signal ABS contains a large error due to the influence of the error detection of the wavenumber count by the periodic signal with the pitch P2. On the other hand, the error signal E is always at a high level within an entire range where the error of the absolute position signal ABS occurs, and according to this embodiment, the region (region R1) where the defect exists can be determined.

As a condition to separate an error detection range and a normal range with high accuracy, the predetermined threshold value Dth with respect to the pattern defect signal D is set to approximately 5% of the amplitude of the position detection signal (signals S1(A), S1(B), S3(A), and S3(B)). Since the spatial frequency response to the image having the pattern periods (pitches P1 and P2) existing on the scale is suppressed to be sufficiently smaller than 5% with respect to the signals S2(A) and S2(B) in this embodiment, it is possible to set the predetermined threshold value Dth as described above.

According to this embodiment, a pattern defect region can be detected by using the error signal E with high accuracy. Therefore, an error operation of a system caused by error detection of the absolute position can be prevented. For example, an absolute position signal can be invalidated if the error signal E is at a high level, and the absolute position signal can be validated when moving to a position where the error signal E is at a low level. After transferring to the increment detection using the phase signal Φ1, the influence of the position detection error caused by the defect is relatively small. Accordingly, as illustrated in FIG. 16D, it is possible to perform the position detection (detection of the position signal INC) without large errors even in a region where the error signal E is at the high level.

Third Embodiment

Figure 17:
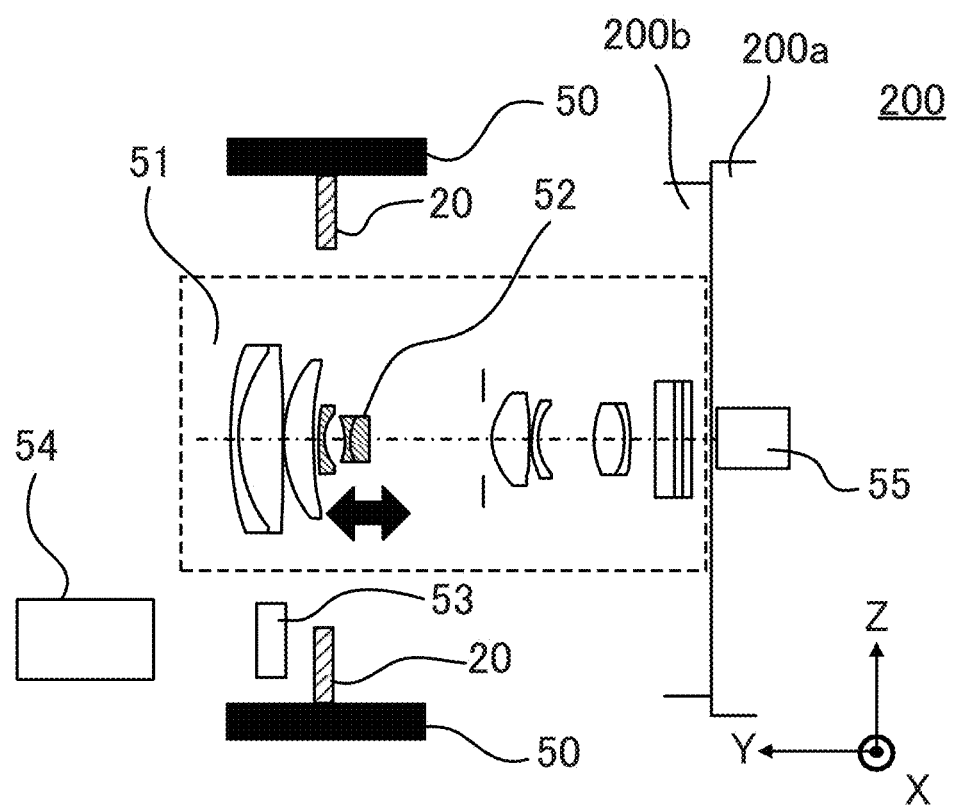
FIG. 17 is a schematic diagram of a cross section of an image pickup system in a third embodiment.

Next, referring to FIG. 17, a third embodiment of the present invention will be described. FIG. 17 is a schematic diagram of a cross section of an image pickup system 200 in this embodiment. The image pickup system 200 is an image pickup system which includes the encoder (position detection apparatus) in each embodiment described above in a lens apparatus. The image pickup system 200 includes an image pickup apparatus 200a and a lens apparatus 200b (a lens barrel including the encoder) which is removably mounted on the image pickup apparatus 200a. However, this embodiment can be applied also to an image pickup system which includes an image pickup apparatus and a lens apparatus integrated with each other.

In FIG. 17, reference numeral 53 denotes a sensor unit, and reference numeral 54 denotes a CPU. The sensor unit 53, the CPU 54, and the scale 20 constitute an encoder (corresponding to the position detection apparatus 100). In this embodiment, for example, the sensor unit 53 corresponds to the sensor unit 7 in each of the first and second embodiments, and the CPU 54 corresponds to the signal processing circuit 101 in each of the first and second embodiments. Reference numeral 51 denotes a lens unit, reference numeral 52 denotes a driven lens, reference numeral 55 denotes an image pickup element, reference numeral 50 denotes a cylindrical body, and an image pickup system is mainly constituted by them. The driven lens 52 (lens) constituting the lens unit 51 is for example an autofocus lens, and it is movable (displaceable) in a Y direction as an optical axis direction. The driven lens 52 may be other lenses such as a zoom lens to be driven. The cylindrical body 50 in this embodiment is coupled to an actuator (not illustrated) that drives the driven lens 52. The image pickup element 55 is provided in an image pickup apparatus 200a, which photoelectrically converts an optical image (object image) formed via the lens unit 51 (lens).

The lens apparatus 200b of this embodiment includes the driven lens 52 movable (displaceable) in the optical axis direction (Y direction) and the encoder (corresponding to the position detection apparatus 100) configured to detect a displacement of the driven lens 52. The scale 20 is attached to the cylindrical body 50. In this configuration, the encoder is a rotary encoder which acquires a rotation amount (displacement) around the optical axis direction of the cylindrical body 50 to detect the displacement of the driven lens 52 in the optical axis direction. In this embodiment, instead of the rotary encoder, a linear encoder that directly detects the displacement in the optical axis direction can be adopted.

The scale 20 is a rotary scale that includes a reflection pattern formed on a doughnut-shaped disk surface, and it is attached to the cylindrical body 50. In this embodiment, the scale 20 may also be a linear scale configured by forming a grating pattern on a film material. In this case, the scale 20 is applied to a cylindrical surface along a rotation direction of the cylindrical body 50.

When the cylindrical body 50 is rotated around the optical axis as a center by an actuator or by hand (manually), the scale 20 is moved (displaced) relative to the sensor unit 53. The driven lens 52 is driven in the Y direction (arrow direction) as the optical axis direction depending on the displacement of the scale 20. The signal depending on the displacement of the driven lens 52 obtained from the sensor unit 53 of the encoder is output to the CPU 54. The CPU 54 generates a drive signal to move the driven lens 52 to a desired position. The driven lens 52 is driven based on the drive signal.

As described above, the position detection apparatus 100 in each embodiment is a position detection apparatus which detects a position of an object (object that moves integrally with a scale or a detector), and it includes a scale 2, a detector (sensor unit 7), and a signal processor (signal processing circuit 101). The scale 2 includes a periodic pattern (scale pattern 8 or 8a). The detector is configured to be movable relative to the scale 2. The signal processor is configured to acquire position information of the object based on a first output signal (signals S1(A) and S1(B)) from the detector and perform abnormality determination based on a second output signal (signals S2(A) and S2(B)) from the detector. A spatial frequency response of the first output signal is peaked (maximized) at a first spatial frequency, and a spatial frequency response of the second output signal is peaked (maximized) at a second spatial frequency different from the first spatial frequency. Preferably, the second spatial frequency is not zero (i.e., the spatial frequency response of the second output signal is not peaked for a direct-current component). The first spatial frequency is for example a spatial frequency where the solid lines in FIGS. 5 and 14 are peaked, and the second spatial frequency is for example a spatial frequency where dotted lines in FIGS. 5 and 14 are peaked.

Preferably, the first spatial frequency corresponds to a period of the pattern formed on the scale. Preferably, the spatial frequency response of the second output signal is minimized at the first spatial frequency. Preferably, the spatial frequency response of the second output signal is not greater than one-tenth of the spatial frequency response of the first output signal at the first spatial frequency. Preferably, the spatial frequency response of the second output signal is minimized (more preferably, zero) at a spatial frequency of zero (i.e., for a direct-current component).

Preferably, the second spatial frequency is lower than the first spatial frequency. Preferably, the signal processor is configured to acquire the position information as absolute position information of the object based on a third output signal (signals S3(A) and S3(B)) from the detector. A spatial frequency response of the third output signal is peaked at a third spatial frequency lower than the second spatial frequency. More preferably, the first spatial frequency is 2n times (n is a natural number) as high as the second spatial frequency. More preferably, each of the first and second output signals is a two-phase sinusoidal signal (signals S1(A) and S1(B) or signals S2(A) and S2(B)) obtained based on a four-phase signal (signals S(A+), S(B+), S(A−), and S(B−)) output from the detector. In this case, the first spatial frequency is four times as high as the second spatial frequency.

Preferably, the detector includes a light receiving element array 9 including a plurality of arrayed light receiving elements, and a switch (switch circuit 10) configured to switch a combination of adding each of output signals of the plurality of light receiving elements. The switch is configured to set a first combination to generate the first output signal when the position information of the object is to be acquired, and set a second combination to generate the second output signal when the abnormality determination is to be performed. More preferably, the plurality of light receiving elements have the same area (size), and the signal processor is configured to perform differential calculation on each of the output signals of the plurality of light receiving elements.

Preferably, the second output signal is a two-phase sinusoidal signal obtained based on a four-phase signal output from the detector, and the signal processor is configured to perform differential calculation on an in-phase signal of the four-phase signal. Alternatively, the signal processor performs addition processing on a reverse phase signal of the four-phase signal.

The position detection apparatus in each embodiment can be applied also to various apparatuses other than the lens apparatus and the image pickup apparatus. For example, a machine tool apparatus that includes a machine tool including at least one of a robot arm and a conveyer configured to convey an object to be assembled, and the position detection apparatus in each embodiment which detects at least one of a position and an attitude of the machine tool is provided, and accordingly the position of the machine tool (robot arm or conveyer) can be detected with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, a position detection apparatus, a lens apparatus, an image pickup system, a machine tool apparatus, a position detection method, and a non-transitory computer-readable storage medium which are capable of detecting abnormality such as adherence of a foreign substance onto a scale and a defect of a scale pattern with high accuracy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-256842, filed on Dec. 19, 2014, which is hereby incorporated by reference herein in its entirety.

What is claimed is:

1. A position detection apparatus which detects a position of an object and whether a defect is present on the scale, the position detection apparatus comprising:
a scale including a substrate on which a periodic pattern is formed;
a detector, including a light receiving circuit, that generates and outputs a first output signal and a second output signal, the detector and the scale being relatively movable to each other, the detector including:
a light receiving element array including a plurality of arrayed light receiving elements that receive light from a light source; and
a switch circuit that switches electrical connections of the plurality of arrayed light receiving elements by:
when acquiring position information of the object, setting a first combination of the plurality of arrayed light receiving elements and maximizing a spatial frequency response of the first output signal at a first spatial frequency; and
when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at a spatial frequency of zero smaller than a spatial frequency response of the first output signal at the first spatial frequency; and
a signal processor that:
controls the switch circuit which sets the first combination of the plurality of arrayed light receiving elements when acquiring position information of the object;
controls the switch circuit which sets the second combination of the plurality of arrayed light receiving elements when determining whether the defect is present;
acquires position information of the object based on the first output signal outputted from the detector, the detector generating the first output signal by adding output signals from the light receiving element array when the first combination of the plurality of arrayed light receiving elements is set; and
determines whether the defect is present on the scale based on the second output signal outputted from the detector, the detector generating the second output signal by adding output signals from the light receiving element array when the second combination of the plurality of arrayed light receiving elements is set.

2. The position detection apparatus according to claim 1, wherein the first spatial frequency corresponds to a period of the pattern formed on the scale.

3. The position detection apparatus according to claim 1, wherein the spatial frequency response of the second output signal is minimized at the first spatial frequency.

4. The position detection apparatus according to claim 1, wherein the spatial frequency response of the second output signal is not greater than one-tenth of the spatial frequency response of the first output signal at the first spatial frequency.

5. The position detection apparatus according to claim 1, wherein the second spatial frequency is lower than the first spatial frequency.

6. The position detection apparatus according to claim 5, wherein:
the signal processor acquires the position information as absolute position information of the object based on a third output signal from the detector, and
a spatial frequency response of the third output signal is peaked at a third spatial frequency lower than the second spatial frequency.

7. The position detection apparatus according to claim 5, wherein the first spatial frequency is 2n times (n is a natural number) as high as the second spatial frequency.

8. The position detection apparatus according to claim 7, wherein:
each of the first and second output signals is a two-phase sinusoidal signal obtained based on a four-phase signal output from the detector, and
the first spatial frequency is four times as high as the second spatial frequency.

9. The position detection apparatus according to claim 1, wherein:
the plurality of arrayed light receiving elements have the same area, and
the signal processor performs differential calculation on each of the output signals of the plurality of arrayed light receiving elements.

10. The position detection apparatus according to claim 1, wherein:
the second output signal is a two-phase sinusoidal signal obtained based on a four-phase signal output from the detector, and
the signal processor performs differential calculation on an in-phase signal of the four-phase signal.

11. The position detection apparatus according to claim 1, wherein:
the second output signal is a two-phase sinusoidal signal obtained based on a four-phase signal output from the detector, and
the signal processor performs addition processing on a reverse phase signal of the four-phase signal.

12. The position detection apparatus according to claim 1, wherein the defect on the scale includes adherence of a foreign substance onto the scale or a defect of the scale pattern.

13. The position detection apparatus according to claim 1, wherein the switch circuit switches the electrical connections of the plurality of arrayed light receiving elements by, when determining whether the defect is present on the scale, setting the second combination of the plurality of arrayed light receiving elements, maximizing the spatial frequency response of the second output signal at the second spatial frequency, and minimizing the spatial frequency response of the second output signal at the spatial frequency of zero.

14. A lens apparatus comprising:
a lens movable in an optical axis direction; and
a position detection apparatus that detects a position of the lens, the position detection apparatus comprising:
a scale including a substrate on which a periodic pattern is formed;
a detector, including a light receiving circuit, that generates and outputs a first output signal and a second output signal, the detector and the scale being relatively movable to each other, the detector including:
a light receiving element array including a plurality of arrayed light receiving elements that receive light from a light source; and
a switch circuit that switches electrical connections of the plurality of arrayed light receiving elements by:
when acquiring position information of the object, setting a first combination of the plurality of arrayed light receiving elements and maximizing a spatial frequency response of the first output signal at a first spatial frequency; and
when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at a spatial frequency of zero smaller than a spatial frequency response of the first output signal at the first spatial frequency; and
a signal processor that:
controls the switch circuit which sets the first combination of the plurality of arrayed light receiving elements when acquiring position information of the object;
controls the switch circuit which sets the second combination of the plurality of arrayed light receiving elements when determining whether the defect is present;
acquires position information of the object based on the first output signal outputted from the detector, the detector generating the first output signal by adding output signals from the light receiving element array when the first combination of the plurality of arrayed light receiving elements is set; and
determines whether the defect is present on the scale based on the second output signal outputted from the detector, the detector generating the second output signal by adding output signals from the light receiving element array when the second combination of the plurality of arrayed light receiving elements is set.

15. An image pickup system comprising:
a lens apparatus comprising:
a lens movable in an optical axis direction; and
a position detection apparatus that detects a position of the lens, the position detection apparatus comprising:
a scale including a substrate on which a periodic pattern is formed;
a detector, including a light receiving circuit, that generates and outputs a first output signal and a second output signal, the detector and the scale being relatively movable to each other, the detector including:
a light receiving element array including a plurality of arrayed light receiving elements that receive light from a light source; and
a switch circuit that switches electrical connections of the plurality of arrayed light receiving elements by:
when acquiring position information of the object, setting a first combination of the plurality of arrayed light receiving elements and maximizing a spatial frequency response of the first output signal at a first spatial frequency; and
when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at a spatial frequency of zero smaller than a spatial frequency response of the first output signal at the first spatial frequency; and
a signal processor that:
controls the switch circuit which sets the first combination of the plurality of arrayed light receiving elements when acquiring position information of the object;
controls the switch circuit which sets the second combination of the plurality of arrayed light receiving elements when determining whether the defect is present;
acquires position information of the object based on the first output signal outputted from the detector, the detector generating the first output signal by adding output signals from the light receiving element array when the first combination of the plurality of arrayed light receiving elements is set; and
determines whether the defect is present on the scale based on the second output signal outputted from the detector, the detector generating the second output signal by adding output signals from the light receiving element array when the second combination of the plurality of arrayed light receiving elements is set; and
an image pickup apparatus including an image pickup element that photoelectrically converts an optical image formed via the lens.

16. A position detection method of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the method comprising:
acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and determining whether or not a defect is present on the scale based on the second output signal from the detector obtained by controlling the switch circuit which sets a second combination of the plurality of arrayed light receiving elements, maximizes a spatial frequency response of the second output signal at a second spatial frequency different from the first spatial frequency, and makes a spatial frequency response of the second output signal at a spatial frequency of zero smaller than a spatial frequency response of the first output signal at the first spatial frequency, the detector generating the second output signal by adding output signals from the light receiving element array when the second combination of the plurality of arrayed light receiving elements is set.

17. A non-transitory computer-readable storage medium storing a program which causes a computer to execute a process of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the process comprising:

acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and determining whether or not a defect is present on the scale based on the second output signal from the detector obtained by controlling the switch circuit which sets a second combination of the plurality of arrayed light receiving elements, maximizes a spatial frequency response of the second output signal at a second spatial frequency different from the first spatial frequency, and makes a spatial frequency response of the second output signal at a spatial frequency of zero smaller than a spatial frequency response of the first output signal at the first spatial frequency, the detector generating the second output signal by adding output signals from the light receiving element array when the second combination of the plurality of arrayed light receiving elements is set.

18. A position detection apparatus which detects a position of an object and whether a defect is present on the scale, the position detection apparatus comprising:

a scale including a substrate on which a periodic pattern is formed;

a detector, including a light receiving circuit, that generates and outputs a first output signal and a second output signal, the detector and the scale being relatively movable to each other, the detector including:

a light receiving element array including a plurality of arrayed light receiving elements that receive light from a light source; and a switch circuit that switches electrical connections of the plurality of arrayed light receiving elements by:

when acquiring position information of the object, setting a first combination of the plurality of arrayed light receiving elements and maximizing the spatial frequency response of the first output signal at a first spatial frequency; and when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at the first spatial frequency of zero smaller than a spatial frequency response of the first output signal at the first spatial frequency; and a signal processor that:

controls the switch circuit which sets the first combination of the plurality of arrayed light receiving elements when acquiring position information of the object;

controls the switch circuit which sets the second combination of the plurality of arrayed light receiving elements when determining whether the defect is present;

acquires position information of the object based on the first output signal outputted from the detector, the detector generating the first output signal by adding output signals from the light receiving element array when the first combination of the plurality of arrayed light receiving elements is set; and determines whether the defect is present on the scale based on the second output signal outputted from the detector, the detector generating the second output signal by adding output signals from the light receiving element array when the second combination of the plurality of arrayed light receiving elements is set.

19. The position detection apparatus according to claim 18, wherein the switch circuit switches the electrical connections of the plurality of arrayed light receiving elements by, when determining whether the defect is present on the scale, setting the second combination of the plurality of arrayed light receiving elements, maximizing the spatial frequency response of the second output signal at the second spatial frequency, and minimizing the spatial frequency response of the second output signal at the first spatial frequency.

20. The position detection apparatus according to claim 18, wherein the switch circuit switches the electrical connections of the plurality of arrayed light receiving elements by, when determining whether the defect is present on the scale, setting the second combination of the plurality of arrayed light receiving elements, maximizing the spatial frequency response of the second output signal at the second spatial frequency, and making the spatial frequency response of the second output signal at the first spatial frequency not greater than 10 percent of the spatial frequency response of the first output signal at the first spatial frequency.

21. A lens apparatus comprising:
a lens movable in an optical axis direction; and
a position detection apparatus that detects a position of the lens, the position detection apparatus comprising:
- a scale including a substrate on which a periodic pattern is formed;
- a detector, including a light receiving circuit, that generates and outputs a first output signal and a second output signal, the detector and the scale being relatively movable to each other, the detector including:
  - a light receiving element array including a plurality of arrayed light receiving elements that receive light from a light source; and
  - a switch circuit that switches electrical connections of the plurality of arrayed light receiving elements by:
    - when acquiring position information of the object, setting a first combination of the plurality of arrayed light receiving elements and maximizing a spatial frequency response of the first output signal at a first spatial frequency; and
    - when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at the first spatial frequency of zero smaller than a spatial frequency response of the first output signal at the first spatial frequency; and
- a signal processor that:
  - controls the switch circuit which sets the first combination of the plurality of arrayed light receiving elements when acquiring position information of the object;
  - controls the switch circuit which sets the second combination of the plurality of arrayed light receiving elements when determining whether the defect is present;
  - acquires position information of the object based on the first output signal outputted from the detector, the detector generating the first output signal by adding output signals from the light receiving element array when the first combination of the plurality of arrayed light receiving elements is set; and
  - determines whether the defect is present on the scale based on the second output signal outputted from the detector, the detector generating the second output signal by adding output signals from the light receiving element array when the second combination of the plurality of arrayed light receiving elements is set.

22. An image pickup system comprising:
a lens apparatus comprising:
  a lens movable in an optical axis direction; and
  a position detection apparatus that detects a position of the lens, the position detection apparatus comprising:
    a scale including a substrate on which a periodic pattern is formed;
    a detector, including a light receiving circuit, that generates and outputs a first output signal and a second output signal, the detector and the scale being relatively movable to each other, the detector including:
      a light receiving element array including a plurality of arrayed light receiving elements that receive light from a light source; and
      a switch circuit that switches electrical connections of the plurality of arrayed light receiving elements by:
        when acquiring position information of the object, setting a first combination of the plurality of arrayed light receiving elements and maximizing a spatial frequency response of the first output signal at a first spatial frequency; and
        when determining whether the defect is present on the scale, setting a second combination of the plurality of arrayed light receiving elements, maximizing a spatial frequency response of the second output signal at a second spatial frequency different from the first spatial frequency, and making a spatial frequency response of the second output signal at the first spatial frequency of zero smaller than a spatial frequency response of the first output signal at the first spatial frequency; and
    a signal processor that:
      controls the switch circuit which sets the first combination of the plurality of arrayed light receiving elements when acquiring position information of the object;
      controls the switch circuit which sets the second combination of the plurality of arrayed light receiving elements when determining whether the defect is present;
      acquires position information of the object based on the first output signal outputted from the detector, the detector generating the first output signal by adding output signals from the light receiving element array when the first combination of the plurality of arrayed light receiving elements is set; and
      determines whether the defect is present on the scale based on the second output signal outputted from the detector, the detector generating the second output signal by adding output signals from the light receiving element array when the second combination of the plurality of arrayed light receiving elements is set; and
an image pickup apparatus including an image pickup element that photoelectrically converts an optical image formed via the lens.

23. A position detection method of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the method comprising:
  acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and determining whether or not a defect is present on the scale based on the second output signal from the detector obtained by controlling the switch circuit which sets a second combination of the plurality of arrayed light receiving elements, maximizes a spatial frequency response of the second output signal at a second spatial frequency different from the first spatial frequency, and makes a spatial frequency response of the second output signal at the first spatial frequency of zero smaller than a spatial frequency response of the first output signal at the first spatial frequency, the detector generating the second output signal by adding output signals from the light receiving element array when the second combination of the plurality of arrayed light receiving elements is set.

24. A non-transitory computer-readable storage medium storing a program which causes a computer to execute a process of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the process comprising:

acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and determining whether or not a defect is present on the scale based on the second output signal from the detector obtained by controlling the switch circuit which sets a second combination of the plurality of arrayed light receiving elements, maximizes a spatial frequency response of the second output signal at a second spatial frequency different from the first spatial frequency, and makes a spatial frequency response of the second output signal at the first spatial frequency of zero smaller than a spatial frequency response of the first output signal at the first spatial frequency, the detector generating the second output signal by adding output signals from the light receiving element array when the second combination of the plurality of arrayed light receiving elements is set.

25. A position detection apparatus which detects a position of an object and whether a defect is present on the scale, the position detection apparatus comprising:

a scale including a substrate on which a periodic pattern is formed;

a detector, including a light receiving circuit, that generates and outputs a first output signal and a second output signal, the detector and the scale being relatively movable to each other, the detector including:

a light receiving element array including a plurality of arrayed light receiving elements that receive light from a light source; and a switch circuit that switches electrical connections of the plurality of arrayed light receiving elements by:

when acquiring position information of the object, setting a first combination of the plurality of arrayed light receiving elements and maximizing a spatial frequency response of the first output signal at a first spatial frequency; and when determining whether the defect is present on the scale, setting a second combination of the plurality of arrayed light receiving elements and maximizing a spatial frequency response of the second output signal at a second spatial frequency different from the first spatial frequency; and a signal processor that:

controls the switch circuit which sets the first combination of the plurality of arrayed light receiving elements when acquiring position information of the object;

controls the switch circuit which sets the second combination of the plurality of arrayed light receiving elements when determining whether the defect is present;

acquires position information of the object based on the first output signal outputted from the detector, the detector generating the first output signal by adding output signals from the light receiving element array when the first combination of the plurality of arrayed light receiving elements is set; and determines whether the defect is present on the scale based on the second output signal outputted from the detector, the detector generating the second output signal by adding output signals from the light receiving element array when the second combination of the plurality of arrayed light receiving elements is set, wherein the scale is configured such that a frequency of the periodic pattern formed on the scale corresponds to the first spatial frequency.

26. A lens apparatus comprising:

a lens movable in an optical axis direction; and a position detection apparatus that detects a position of the lens, the position detection apparatus comprising:

a scale including a substrate on which a periodic pattern is formed;

a detector, including a light receiving circuit, that generates and outputs a first output signal and a second output signal, the detector and the scale being relatively movable to each other, the detector including:

a light receiving element array including a plurality of arrayed light receiving elements that receive light from a light source; and a switch circuit that switches electrical connections of the plurality of arrayed light receiving elements by:

when acquiring position information of the object, setting a first combination of the plurality of arrayed light receiving elements and maximizing a spatial frequency response of the first output signal at a first spatial frequency; and when determining whether the defect is present on the scale, setting a second combination of the plurality of arrayed light receiving elements and maximizing a spatial frequency response of the second output signal at a second spatial frequency different from the first spatial frequency; and a signal processor that:
controls the switch circuit which sets the first combination of the plurality of arrayed light receiving elements when acquiring position information of the object;
controls the switch circuit which sets the second combination of the plurality of arrayed light receiving elements when determining whether the defect is present;
acquires position information of the object based on the first output signal outputted from the detector, the detector generating the first output signal by adding output signals from the light receiving element array when the first combination of the plurality of arrayed light receiving elements is set; and
determines whether the defect is present on the scale based on the second output signal outputted from the detector, the detector generating the second output signal by adding output signals from the light receiving element array when the second combination of the plurality of arrayed light receiving elements is set,
wherein the scale is configured such that a frequency of the periodic pattern formed on the scale corresponds to the first spatial frequency.

27. An image pickup system comprising:
a lens apparatus comprising:
a lens movable in an optical axis direction; and
a position detection apparatus that detects a position of the lens, the position detection apparatus comprising:
a scale including a substrate on which a periodic pattern is formed;
a detector, including a light receiving circuit, that generates and outputs a first output signal and a second output signal, the detector and the scale being relatively movable to each other, the detector including:
a light receiving element array including a plurality of arrayed light receiving elements that receive light from a light source; and
a switch circuit that switches electrical connections of the plurality of arrayed light receiving elements by:
when acquiring position information of the object, setting a first combination of the plurality of arrayed light receiving elements and maximizing a spatial frequency response of the first output signal at a first spatial frequency; and
when determining whether the defect is present on the scale, setting a second combination of the plurality of arrayed light receiving elements and maximizing a spatial frequency response of the second output signal at a second spatial frequency different from the first spatial frequency; and
a signal processor that:
controls the switch circuit which sets the first combination of the plurality of arrayed light receiving elements when acquiring position information of the object;
controls the switch circuit which sets the second combination of the plurality of arrayed light receiving elements when determining whether the defect is present;
acquires position information of the object based on the first output signal outputted from the detector, the detector generating the first output signal by adding output signals from the light receiving element array when the first combination of the plurality of arrayed light receiving elements is set; and
determines whether the defect is present on the scale based on the second output signal outputted from the detector, the detector generating the second output signal by adding output signals from the light receiving element array when the second combination of the plurality of arrayed light receiving elements is set,
wherein the scale is configured such that a frequency of the periodic pattern formed on the scale corresponds to the first spatial frequency; and
an image pickup apparatus including an image pickup element that photoelectrically converts an optical image formed via the lens.

28. A position detection method of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the method comprising:
acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and
determining whether or not a defect is present on the scale based on the second output signal from the detector obtained by controlling the switch circuit which sets a second combination of the plurality of arrayed light receiving elements and maximizes a spatial frequency response of the second output signal at a second spatial frequency different from the first spatial frequency, the detector generating the second output signal by adding output signals from the light receiving element array when the second combination of the plurality of arrayed light receiving elements is set,
wherein the scale is configured such that a frequency of the periodic pattern formed on the scale corresponds to the first spatial frequency.

29. A non-transitory computer-readable storage medium storing a program which causes a computer to execute a process of detecting a position of an object which moves integrally with one of a scale or a detector based on an output signal from the detector, the scale including a substrate on which a periodic pattern is formed, and the detector, including a light receiving circuit, generating and outputting a first output signal and a second output signal, the detector and the scale being relatively movable to each other, the detector including a light receiving element array, including a plurality of arrayed light receiving elements that receive light from a light source, and a switch circuit that switches a combination of the plurality of arrayed light receiving elements, the process comprising:

acquiring position information of the object based on the first output signal from the detector obtained by controlling the switch circuit which sets a first combination of the plurality of arrayed light receiving elements and maximizes a spatial frequency response of the first output signal at a first spatial frequency, the detector generating the first output signal by adding output signals from the light receiving element array when the first combination of the plurality of arrayed light receiving elements is set; and determining whether or not a defect is present on the scale based on the second output signal from the detector obtained by controlling the switch circuit which sets a second combination of the plurality of arrayed light receiving elements and maximizes a spatial frequency response of the second output signal at a second spatial frequency different from the first spatial frequency, the detector generating the second output signal by adding output signals from the light receiving element array when the second combination of the plurality of arrayed light receiving elements is set, wherein the scale is configured such that a frequency of the periodic pattern formed on the scale corresponds to the first spatial frequency.

* * * * *